United States Patent
Joglekar et al.

(10) Patent No.: US 11,281,552 B2
(45) Date of Patent: Mar. 22, 2022

(54) SELF-LEARNING ALERTING AND ANOMALY DETECTION

(71) Applicant: Visa International Service Association, San Francisco, CA (US)

(72) Inventors: Pushkar Joglekar, Emeryville, CA (US); Ajit Gaddam, Foster City, CA (US); Heng Tang, San Mateo, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 17/052,336

(22) PCT Filed: Apr. 30, 2019

(86) PCT No.: PCT/US2019/029923
§ 371 (c)(1),
(2) Date: Nov. 2, 2020

(87) PCT Pub. No.: WO2019/213086
PCT Pub. Date: Nov. 7, 2019

(65) Prior Publication Data
US 2021/0374027 A1    Dec. 2, 2021

Related U.S. Application Data

(60) Provisional application No. 62/665,940, filed on May 2, 2018.

(51) Int. Cl.
*G06F 11/00* (2006.01)
*G06F 11/30* (2006.01)
(Continued)

(52) U.S. Cl.
CPC ........ *G06F 11/3006* (2013.01); *G06F 11/076* (2013.01); *G06F 11/0772* (2013.01);
(Continued)

(58) Field of Classification Search
CPC .. G06F 11/3452; G06F 11/34; G06F 11/3447; G06F 11/3086; G06F 11/3409; G06F 11/076; G06F 11/3072
See application file for complete search history.

(56) References Cited

U.S. PATENT DOCUMENTS 10,412,111 B2 *  9/2019  Hillard ................ H04L 63/1425
2009/0271664 A1  10/2009  Haas et al.
(Continued)

OTHER PUBLICATIONS

Application No. PCT/US2019/029923, International Search Report and Written Opinion, dated Aug. 7, 2019, 10 pages.

*Primary Examiner* — Charles Ehne
(74) *Attorney, Agent, or Firm* — Kilpatrick Townsend & Stockton LLP

(57) ABSTRACT

Methods and systems for evaluating metrics (e.g., quality of service metrics) corresponding to a monitored computer, detecting metric anomalies, and issuing alerts, are disclosed. A metrics collecting agent, operating on a monitored computer, collects metrics corresponding to the monitored computer and/or one or more monitored services. These metrics are transmitted to a monitoring server that dynamically determines metric thresholds corresponding to normal metrics and anomalous metrics. Using these metric thresholds, along with a machine learning model, the monitoring server can determine whether one or more metrics are anomalous, automatically issue alerts to security and operations teams, and/or transmit a control instruction to the monitored computer in order to fix the issue causing the anomalous metrics.

20 Claims, 13 Drawing Sheets

(51) Int. Cl.
   *G06F 11/34* (2006.01)
   *G06K 9/62* (2022.01)
   *G06F 11/07* (2006.01)

(52) U.S. Cl.
   CPC ...... *G06F 11/3072* (2013.01); *G06F 11/3409* (2013.01); *G06K 9/6256* (2013.01)

(56) References Cited

U.S. PATENT DOCUMENTS

| | | |
|---|---|---|
| 2013/0132775 A1 | 5/2013 | Onoue |
| 2014/0229768 A1 | 8/2014 | Bernstein et al. |
| 2016/0147583 A1* | 5/2016 | Ben Simhon ........... H04L 43/16 714/47.3 |
| 2017/0010931 A1 | 1/2017 | Agarwal et al. |
| 2018/0191763 A1* | 7/2018 | Hillard .................. G06F 21/552 |
| 2019/0250950 A1* | 8/2019 | Huang .................. G06F 9/5005 |

* cited by examiner

SELF-LEARNING ALERTING AND ANOMALY DETECTION

CROSS-REFERENCE TO RELATED APPLICATIONS

This application is a 371 National Stage of International Application No. PCT/US2019/029923, International Filing Date Apr. 30, 2019, which claims the benefit of the priority date of U.S. Provisional Application No. 62/665,940, filed on May 2, 2018, which are herein incorporated by reference in their entirety.

BACKGROUND

Computerized systems, and the services that they provide, need to function as intended. An unreliable or unavailable computer system or service can have adverse consequences. As examples, the failure of a data protection system can result in people's personally identifiable information (PII) being exposed, and the failure of a computerized medical database can cause problems for medical services.

For these reasons, service monitoring systems are often deployed by people and organizations in order to monitor the performance of computers and services that they provide. These service monitoring systems can be used to detect imminent problems with services and forewarn those problems. Service monitoring systems typically collect values associated with "service metrics" or "quality of service (QoS) metrics" from monitored services, such as the service uptime, service latency, etc. The evaluation of service metrics can be used to determine whether or not the monitored services or computers are performing as expected.

In conventional service monitoring, a subject matter expert can define performance thresholds for each analyzed service metric. When a service metric exceeds its threshold, the subject matter expert can notify an operations team that can implement a fix to the service.

Conventional service monitoring systems have several problems associated with them, particularly due to the reliance on so-called subject matter experts. The workload associated with setting thresholds for service metrics increases multiplicatively with the number of service metrics and the number of services. As systems scale upward, the demand on the subject matter expert scales similarly.

The problem is compounded by recent software development trends, such as the use of microservice architectures. In a microservice architecture, programs and services are developed and implemented as a collection of microservices. Rather than collecting metrics from a single service, service monitoring systems must collect metrics from a large number of microservices, greatly increasing the number issues that need to be addressed by a subject matter expert.

Embodiments address these and other problems, individually and collectively.

SUMMARY

Embodiments of the present disclosure are generally directed to methods and systems for evaluating sets of metrics in order to determine whether metrics in the sets of metrics are normal or anomalous. These sets of metrics may correspond to a monitored computer, or monitored services (for example, a database management service) operating on the monitored computer. Anomalous metrics may indicate an ongoing or potential problem with the monitored computer or the monitored services. For example, anomalously high CPU usage may suggest that the monitored computer may crash in the near future. In the case of anomalous metrics, the monitoring server may automatically issue an alert to a security or operations team. Additionally, using a feature known as auto fix, the monitoring server may transmit a control instruction to the monitored computer, in order to fix the problem causing the anomalous metrics.

In order to classify metrics as normal or anomalous, the monitoring server may dynamically generate metric thresholds. These metric thresholds may define the range of metric values corresponding to normal metrics and anomalous metrics. As an example, for a metric such as virtual memory usage, a metric lower threshold of 10 MB and a metric upper threshold of 30 MB may indicate that virtual memory usage between 10 MB and 30 MB is normal, while virtual memory usage less than 10 MB or greater than 30 MB is anomalous. The monitoring server may learn normal ranges for each metric based on previously collected metrics, and uses those ranges to determine metric thresholds. The metric thresholds may then be used to determine if a set of currents metric values, or a set of recently collected metric values are normal or anomalous.

The monitoring server may additionally use a machine learning model in order to classify metrics as either normal or anomalous. The machine learning model may take a set of metrics and their associated values as an input, and output an anomaly score. The anomaly score may correspond to a probability or prediction that the input set of metrics and their associated values are anomalous. For example, an anomaly score of 0 may indicate that there is a 0% chance that the input set of metrics and their associated values are anomalous, while an anomaly score of 1 may indicate that there is a 100% chance that the set of metrics and their associated values are anomalous.

If anomalous metrics are detected, the monitoring server may attempt to identify a metric anomaly pattern. This metric anomaly pattern may comprise a sequence of sets of metrics and their associated values, where one or more of the sets of metrics and their associated values are anomalous. These metric anomaly patterns may be used to predict or associate metric anomalies.

If the anomalous metrics correspond to a known anomaly pattern, the monitoring server may issue an alert to a security/operations team or security system indicating that a known anomaly was detected. If the anomalous metrics do not correspond to a known anomaly pattern, the monitoring server may also issue an alert to a security/operations team, or security system, indicating that an unknown anomaly was detected. The monitoring server may store and retrieve metric anomaly patterns from a metric anomaly database, in order to identify known anomalies.

Additionally, the monitoring server may use a feature known as auto fix. In the event that a known anomaly pattern is identified, the monitoring server may identify a control instruction associated with the known anomaly pattern. The control instruction may be sent to the monitored computer in order to fix any underlying problem that may have caused the anomaly. As an example, the control instruction may be an instruction to reboot the monitored computer or a monitored service on the monitored computer. The auto fix feature may allow the monitored computer to be fixed without the intervention of a human operator.

Embodiments provide a number of beneficial features and advantages over conventional systems service monitoring systems. Including, among others, the following.

Embodiments allow for quick, reliable, and accurate determination of metric thresholds for large numbers of metrics using statistical methods. This is a large and practical improvement over conventional methods, which rely on subject matter experts to determine and implement metric thresholds for each examined metric. This results in an increase in true positive and true negative classification rates, as well as a corresponding decrease in false positive and false negative classification rates.

Additionally, the improvement in true classification rate improves the reliability of alerting. In conventional monitoring systems, high false positive rates and false negative rates limit the effectiveness of alerting. Security/operations team members have to continually employ their own judgement to determine if an alert is legitimate or the result of a poorly calibrated service monitoring system. Because the metric thresholds produced by embodiments are more accurate than those employed in conventional monitoring systems, security and operations teams can have greater confidence in the accuracy of alerts.

Further, by automating the determination of metric thresholds, embodiments can employ a larger quantity of metrics than conventional monitoring systems, improving the detection rate of anomalies. Conventional methods, because of their reliance on human subject matter experts, can only examine a limited number of metrics that are within the subject matter expert's area of expertise. As a result, in conventional systems, many anomalies can go undetected because metrics indicating those anomalies are unexamined. By contrast, because the monitoring server according to embodiments can automatically generate thresholds for any number of metrics, the likelihood of detecting anomalies is improved.

Additionally, embodiments of the present disclosure improve anomaly detection by examining both temporal trends and correlational trends in metrics. By dynamically generating metric thresholds based on previously collected metrics and their associated metric values, the monitoring server can account for time-based trends or changes in metrics values that may indicate anomalies. By employing the machine learning model, the monitoring server can account for correlations between metrics that may indicate anomalies. Because the monitoring server uses both, it has a distinct advantage over traditional time-series analysis techniques, which may detect anomalous changes in service metrics but not detect anomalous correlations between service metrics. The monitoring server also has an advantage over traditional machine learning techniques, which may detect anomalous correlations between metrics, but fail to detect the time-based trends.

Further, because embodiments provide for the identification of metric anomaly patterns, the monitoring system is able to predict and alert security and operations teams about future anomalies. This allows security or operations teams to address problems before they occur, preventing failure of the monitored computer or monitored services. Further, in some cases, using the auto fix feature, the monitoring server may fix problems that cause the anomalous metrics without any intervention by security or operations teams.

Additionally, embodiments are more compatible with current trends in software development, particularly microservice architectures. In microservice architectures, it is practically impossible for a subject matter expert to set thresholds for each and every service metrics produced by the microservices. By contrast, embodiments provide for automatic, dynamic determination of any number of service metrics, allowing embodiments to scale easily for large or complex microservice architectures.

One embodiment is directed to a method comprising: receiving, by a monitoring server, from a monitored computer, a set of current metrics and a set of current metric values associated with the current metrics; determining, by the monitoring server, a current time interval associated with the set of current metrics and the set of current metric values; storing, by the monitoring server, the set of current metrics and the set of current metric values in a metrics database in association with the current time interval; retrieving, by the monitoring server, a predetermined number of sets of metrics and their associated metric values from the metrics database, wherein the predetermined number of sets of metrics and their associated metric values correspond to a predetermined number of time intervals; determining, by the monitoring server, a set of metric thresholds corresponding to the set of current metrics, wherein the set of metric thresholds are determined based on the predetermined number of sets of metrics and their associated metric values; determining, by the monitoring server, whether each current metric value of the set of current metric values corresponding to the set of current metrics is within corresponding metric thresholds of the set of metric thresholds; determining, by the monitoring server, a first metric anomaly score by applying the set of current metric values corresponding to the set of current metrics as inputs to a machine learning model; determining, by the monitoring server, a second metric anomaly score based on the first metric anomaly score and a set of metric deviation values derived from the set of current metric values and the set of metric thresholds; and issuing, by the monitoring server, an alert based on the second metric anomaly score.

Another embodiment is directed to a monitoring server comprising: a processor; and a non-transitory computer readable medium coupled to the processor, the non-transitory computer readable medium comprising code, executable by the processor for implementing the above-noted method.

These and other embodiments are described in detail below. A better understanding of the nature and advantages of embodiments may be gained with reference to the following detailed description and the accompanying drawings.

Terms

A "server computer" may include a powerful computer or cluster of computers. For example, the server computer can be a large mainframe, a minicomputer cluster, or a group of servers functioning as a unit. In one example, the server computer may be a database server coupled to a web server. The server computer may comprise one or more computational apparatuses and may use any of a variety of computing structures, arrangements, and compilations for servicing the requests from one or more client computers.

A "memory" may include any suitable device or devices that may store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may include any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

"Entities" may include things with distinct and independent existence. For example, entities may include people, organizations (e.g., partnerships and businesses), computers, and computer networks, among others. An entity can communicate or interact with its environment in some manner. Further, an entity can operate, interface, or interact with a computer or computer network during the course of its existence.

A "monitored computer" may include a computer system that is being monitored or observed for some purpose. For example, a monitored computer may be a computer system that executes a "monitored service" (e.g., an email hosting service). The monitored computer may be monitored in order to evaluate how well the monitored computer is performing the monitored service, or how well the monitored service is performing its intended function.

A "monitoring server" may include a server computer that monitors something. For example, a monitoring server may include a server computer that monitors a monitored computer or a monitored service in order to evaluate how the monitored computer or monitored service is being executed.

A "time interval" may include a period of time. For example, a time interval may include a period of time with a defined start time and a defined end time, such as "12:00 P.M. to 1:00 P.M." A time interval may correspond to an event or a measurement, such as the time interval during which a set of data was collected.

A "metric" may include something that can be measured. Metrics may be used to quantitatively assess something, such as a process or event. A metric may have a corresponding "metric value." For example, the metric "latency" may have a corresponding metric value of 100 ms. Metrics may be included in a "set of metrics," which may include a collection of one or more metrics. A set of metrics may include, for example, a latency metric and a CPU usage metric. A set of metrics may correspond to a monitored computer or a monitored service.

A "distance metric" may include a measurement of the distance or difference between two things. For example, a distance metric may include a measurement of the difference between two files stored on a computer system, or the difference between two passages in a book.

"Metadata" may include data that provides information about other data. Types of metadata include descriptive metadata, structural metadata, administrative metadata, reference metadata and statistical metadata.

A "metric threshold" may include a threshold used to evaluate a metric value. A metric value can be compared to a metric threshold in order to determine if the metric value is greater than or less than the metric threshold. A metric threshold comparison can be used to conditionally trigger some action, e.g., if a metric value is greater than a corresponding metric threshold, some action may take place.

A "metric deviation value" may include a value corresponding to the difference between a metric value and some other value. For example, a metric deviation value may include a value corresponding to the difference between a metric value and a corresponding metric threshold.

A "machine learning model" may include an application of artificial intelligence that provides systems with the ability to automatically learn and improve from experience without explicitly being programmed. A machine learning model may include a set of software routines and parameters that can predict an output of a process (e.g., identification of an attacker of a computer network, authentication of a computer, a suitable recommendation based on a user search query, etc.) based on a "feature vector" or other input data. A structure of the software routines (e.g., number of subroutines and the relation between them) and/or the values of the parameters can be determined in a training process, which can use actual results of the process that is being modeled, e.g., the identification of different classes of input data. Examples of machine learning models include support vector machines, models that classify data by establishing a gap or boundary between inputs of different classifications, as well as neural networks, collections of artificial "neurons" that perform functions by activating in response to inputs.

A "feature vector" may include a set of measurable properties (or "features") that represent some object or entity. A feature vector can include collections of data represented digitally in an array or vector structure. A feature vector can also include collections of data that can be represented as a mathematical vector, on which vector operations such as the scalar product can be performed. A feature vector can be determined or generated from input data. A feature vector can be used as the input to a machine learning model, such that the machine learning model produces some output or classification. The construction of a feature vector can be accomplished in a variety of ways, based on the nature of the input data. For example, for a machine learning classifier that classifies words as correctly spelled or incorrectly spelled, a feature vector corresponding to a word such as "LOVE" could be represented as the vector (12, 15, 22, 5), corresponding to the alphabetical index of each letter in the input data word. For a more complex input, such as a human entity, an exemplary feature vector could include features such as the human's age, height, weight, a numerical representation of relative happiness, etc. Feature vectors can be represented and stored electronically in a feature store. Further, a feature vector can be normalized, i.e., be made to have unit magnitude. As an example, the feature vector (12, 15, 22, 5) corresponding to "LOVE" could be normalized to approximately (0.40, 0.51, 0.74, 0.17).

An "anomaly score" may include a score that indicates how normal or anomalous something is. For example, an anomaly score can indicate how anomalous a set of input data is. Classification data produced by a machine learning model may be an anomaly score. An anomaly score can be within a defined range, such as 0→1, −1→1, or 0→100. An anomaly score can be compared against a threshold in order to make a decision. For example, if an anomaly score exceeds a threshold, a computer can halt or terminate a process associated with the input data that produced the corresponding anomaly score.

An "anomaly pattern" may include a sequence or pattern of things that are associated in some way with an anomaly. For example, an anomaly pattern may include a sequence of anomaly scores, or a sequence of input data associated with their corresponding anomaly scores. An anomaly pattern may take the form of an ordered list of things and the associated anomaly scores, such as an ordered list of sets of metrics and the anomaly scores associated with those sets of metrics.

"System level activity data" may include data related to the operation of a process or service at a system level. System level activity data may include system calls or commands made by a process or service during the operation of that process or service. System level activity data may also include the capabilities of a process or service, or the capabilities needed by that process or service in order to perform its intended function.

A "system call" may include a request by a software application for a service from the operating system kernel. This may include hardware-related services (e.g., reading from the keyboard, accessing a disk drive, etc.), creating and executing new processes, and communicating with kernel services such as process scheduling. Examples of system calls include open, read, write, and exit, among others.

"System call data" may include data corresponding to a system call. This may include an identifier of the system call (e.g., write) the target or inputs of the system call (such as a directory), the system time when the system call was made, among others. System call data may be compiled in an "audit log" or "security log" that contains records of multiple system calls made over a period of time.

A "command" may include a directive to a program to perform a specific task. A command may be executed from a system shell either directly or indirectly by an entity such as a user. A command may apply some action on input data and generate output data. As an example, a command may be used to generate output data in the form of system or disk files. Commands may have a syntax, such as "verb [options] [arguments]."

"Capabilities" may include sets of privileges given to processes or services. Capabilities may be independently enabled and disabled for distinct processes or services. Examples of capabilities include "CAP_SETGID," which allows a process to arbitrarily manipulate process GIDs (group identifiers) and supplementary GID lists.

A "security policy" may include a policy that defines security capabilities. A security policy may further describe or outline permitted and non-permitted actions or processes, including permitted and non-permitted system calls and commands. A computer system may have numerous security policies. For example, a computer system may have a security policy for each individual service executed by the computer system, as well as a security policy governing communications over a network.

DETAILED DESCRIPTION

Figure 3:
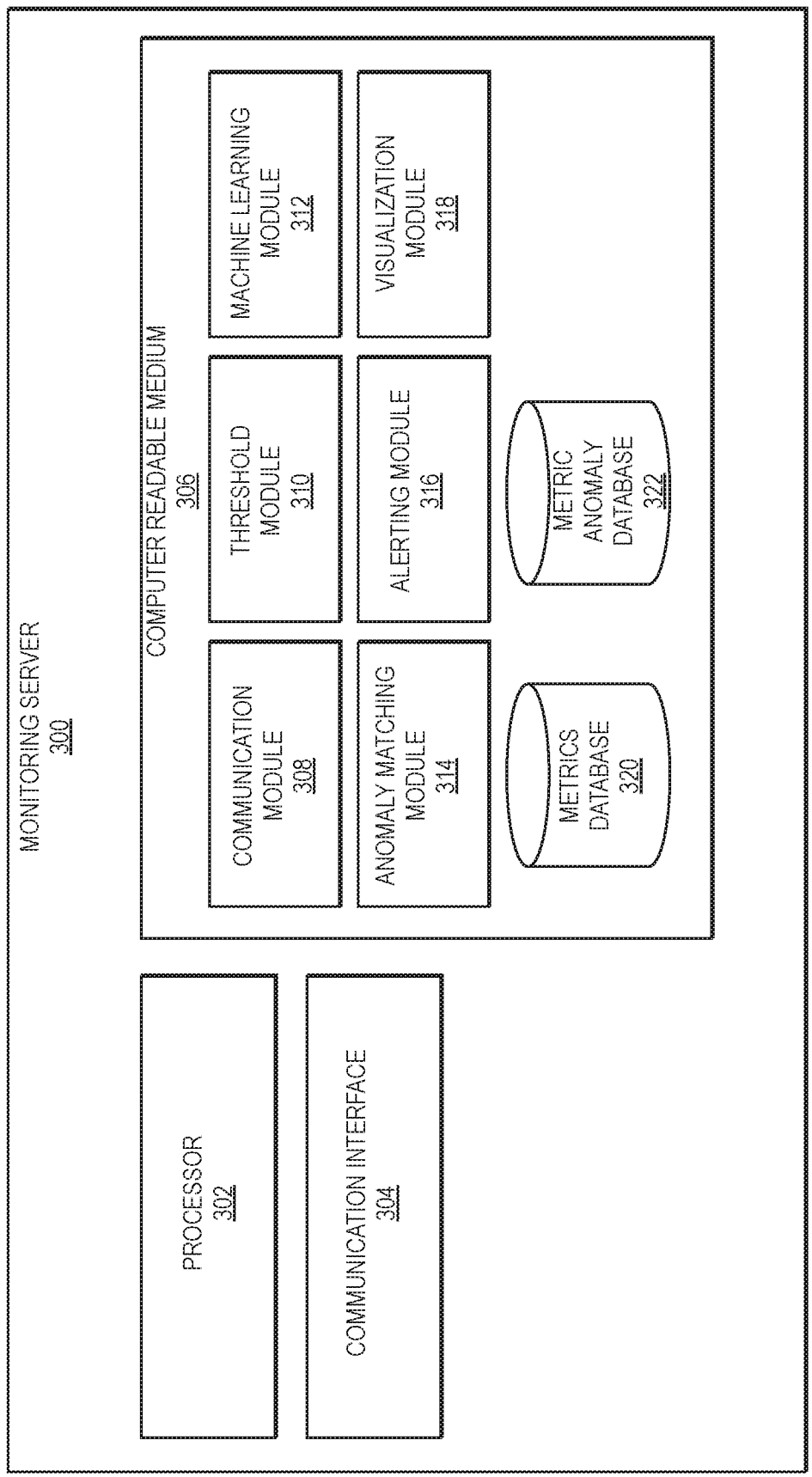
FIG. 3 shows a system block diagram of a monitoring server according to some embodiments.
Figure 4:
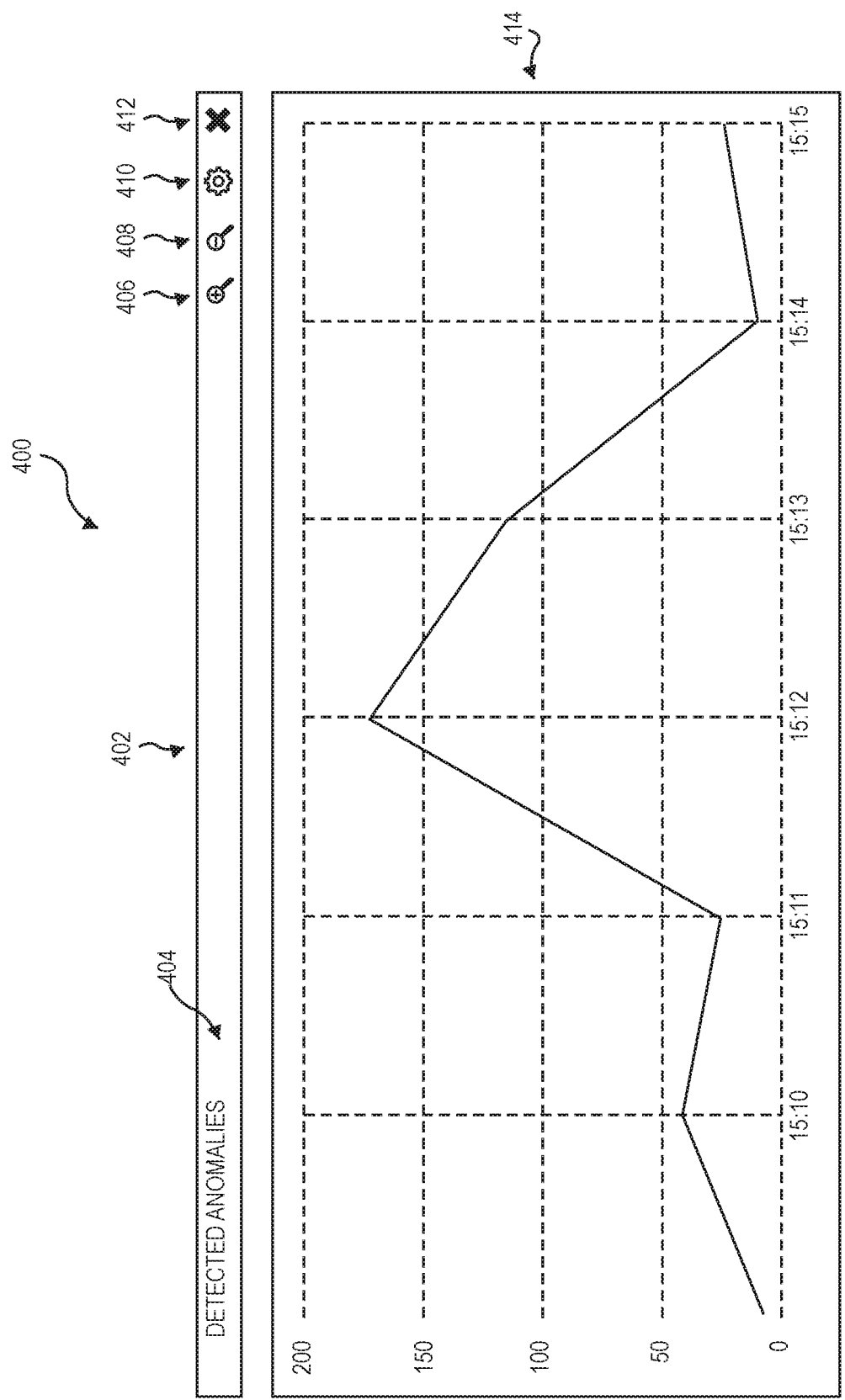
FIG. 4 shows an exemplary metric anomaly visualization according to some embodiments.

Systems and methods according to embodiments will be described generally with reference to FIG. 1. Next, the monitored computer and monitoring server, two elements of the system diagram of FIG. 1, will be described in greater detail with reference to FIGS. 2 and 3 respectively. FIG. 3 will describe the capabilities of the monitoring server and actions performed by the monitoring server, in performing some methods according to embodiments. FIG. 4, an exemplary visualization will be described during the description of the visualization module of the monitoring server of FIG. 3.

Subsequently, methods according to embodiments of the invention will be described with reference to FIGS. 5A-C. At times during the description of these methods, reference will be made to FIGS. 6 and 7 in order to describe metric collecting procedures, and dynamic metric threshold calculation and metric classification respectively.

To conclude, a description of two proof-of-concept experiment is provided, with references to the graphs of FIGS. 8-11.

Figure 1:
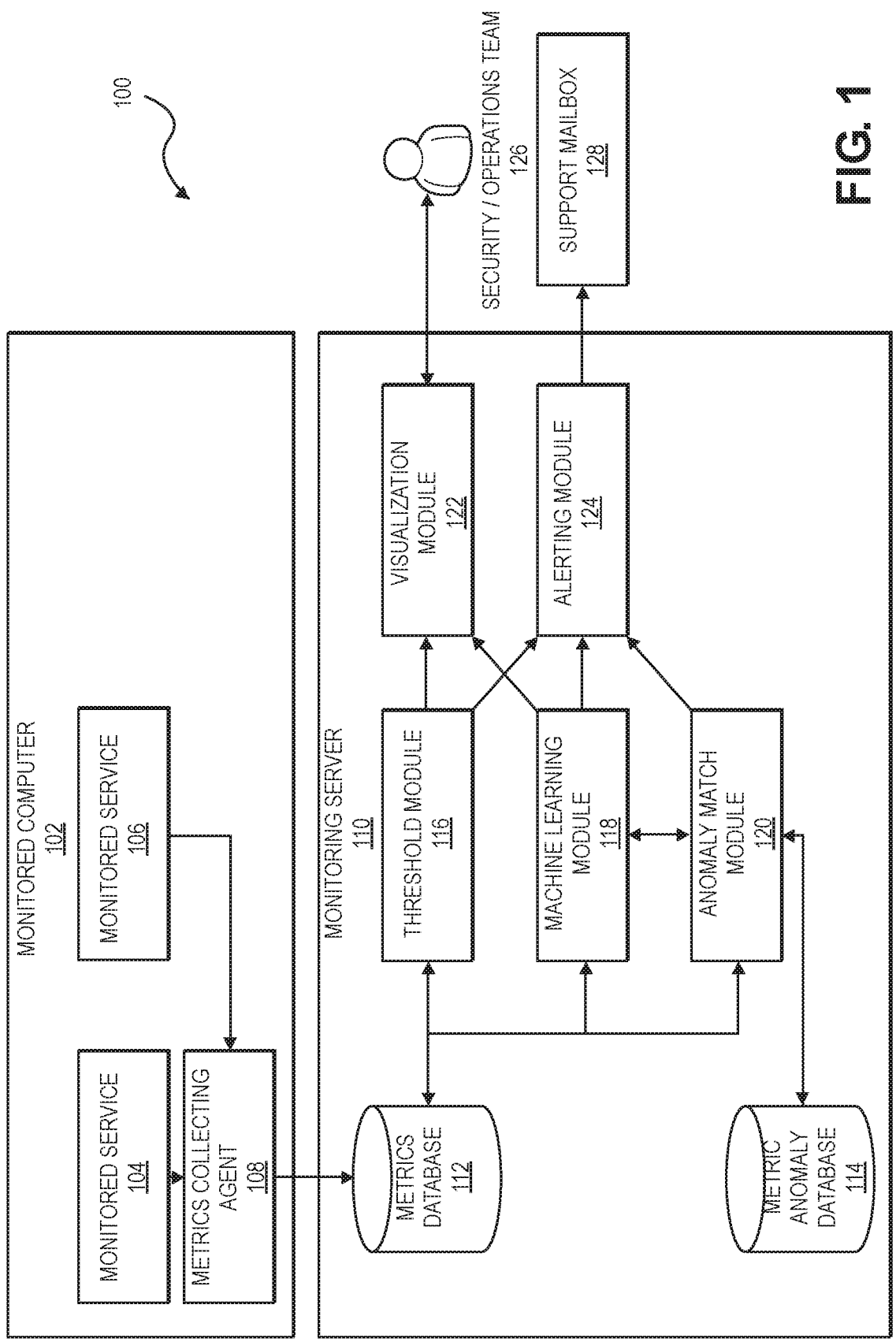
FIG. 1 shows a system block diagram of a monitored computer and a monitoring server, comprising a service monitoring system according to some embodiments.

FIG. 1 shows a system 100 according to some embodiments. As described above, embodiments are direct to methods and systems for detecting metric anomalies, issuing alerts based on those metric anomalies, identifying metric anomalies patterns, and in some cases, transmitting control instructions in order to fix issues causing those metric anomalies.

The entities of FIG. 1 can communicate with one another via any appropriate means, including a communications network. Messages and other communications between the entities may be in encrypted or unencrypted form and may be mutually authenticated. A communications network may be any one and/or the combination of the following: a direct interconnection; the Internet; a Local Area Network (LAN); a Metropolitan Area Network (MAN); an Operating Mission as Nodes on the Internet (OMNI); a secured custom connection; a Wide Area Network (WAN); a wireless network (e.g., employing protocols such as but not limited to a Wireless Application (Protocol), I-mode, and/or the like); and/or the like. Messages between the devices, computers, and entities may be transmitted using a secure communication protocol such as, but not limited to, File Transfer Protocol (FTP); Hypertext Transfer Protocol (HTTP); Secure Hypertext Transfer Protocol (HTTPS), Secure Socket Layer (SSL); and/or the like.

Monitoring server 110 can periodically collect metrics and associated metric values from monitored computer 102. As an aside, although only one monitored computer 102 is shown in FIG. 1, it should be understood that methods according to embodiments may be practiced with any number of monitored computers. However, for the sake of clarity, the description below is presented for a system comprising a single monitored computer 102. The monitoring server 110 can receive these metrics and associated metric values from a metrics collecting agent 108, a hardware or software module operating on monitored computer 102. These metrics and their associated metric values may correspond to monitored services 104 and 106 (e.g., video streaming services) that are operating on the monitored computer 102. Although two monitored services 104 and 106 are shown, metrics and associated metric values may be collected from any number of monitored services. In some embodiments, metrics may be collected from the monitored computer 102 itself, and may not correlate to any monitored services. For example, metrics collecting agent 108 may collect a metric such as the CPU temperature.

Some examples of metrics include open file descriptors (integers that can be used to identify an opened file), process scheduling type (user mode or system mode), number of page faults (both minor and major), number of I/O read write calls, number of system calls, uptime, system temperature, system memory capacity, CPU cycles, system processing speed, number of heartbeats, a change in the number of minor faults, a change in the number of major faults, a change in the uptime, a change in the number of heartbeats, a change in the number of CPU cycles, etc. Collections of metrics may be referred to as a set of metrics. For example, a set of metrics comprising three metrics may comprise metrics and metric values corresponding to open file descriptors, number of system calls, and uptime. A set of metrics corresponding to the recent or immediate past may be referred to as a set of "current metrics." As an example, a CPU temperature recording corresponding to the last 30 seconds may be considered a current metric, while a CPU temperature recording corresponding to a 30 second period 10 days ago may be considered a previous metric. The monitoring server 110 may periodically evaluate sets of current metrics and sets of current metric values corresponding to those sets of current metrics, in order to determine if those sets of current metrics are normal or anomalous.

In some embodiments, a set of metrics may comprise a single metric. Metrics values may correspond to metrics or changes in those metrics. For example, a metric value may correspond to the number of CPU cycles associated with monitored server 104 over a given time period (e.g., 15 seconds) or may correspond to the change in the number of CPU cycles associated with monitored server 104 over a given time period.

The metrics collecting agent 108 may transfer sets of metrics and sets of associated metric values to the monitoring server 110. These sets of metrics and sets of associated metric values may be transferred automatically and periodically. Alternatively, the monitoring server 110 may transmit a message requesting sets of metrics and their associated metric values from the monitored computer 102 and the monitored computer 102 may respond by transmitting the requested sets of metrics and their associate metric values. The sets of metrics and their associated metric values may be transferred over any appropriate network or via any appropriate means (e.g., a communications network as described above). An API or web API may be used to request and/or transfer sets of metrics and their associated metric values from the monitored computer 102 to the monitoring server 110.

The monitoring server 110 may store sets of metrics and their associated metric values received from the monitored computer 102 in a metrics database 112. The metrics database 112 may store sets of metrics and their associated metric values in any appropriate form. In some embodiments, the sets of metrics and their associated metric values stored in the metrics database 112 may be stored sequentially based on time intervals corresponding to the sets of metrics and their associated metric values. A time interval may correspond to a period of time during which the metrics and their associated metric values were collected by the metrics collecting agent 108 or received by the monitoring server 110 (e.g., from 4:51 P.M. to 4:52 P.M.). The sets of metrics and their associated metric values stored in the metrics database 112 may be stored in association with any appropriate metadata or "tags." For example, a set of metrics and their associated metric values in the metrics database 112 may be stored in association with a tag such as "training," indicating that the set of metrics and their associated metric values may be used as training data for a machine learning model. As another example, a set of metrics and their associated metric values in the metrics database may be stored in association with an anomaly score, such as "80," which may indicate that there is an 80% chance that the set of metrics and their associated metric values corresponds to an anomaly.

The sets of metrics and their associated metric values stored in the metrics database 112 may be backed up using a distributed file system backend, such as a master-slave deployment. Changes made to the master metrics database 112 (e.g., the addition of a new set of metrics and their associated metric values) may be propagated to any number of slave metrics databases.

The monitoring server 110 may use sets of metrics and their associated values stored in the metrics database 112 in order to determine metric thresholds for any number of metrics. The monitoring server 110 may use threshold module 116, a software module, for this purpose. These metric thresholds may be used by the monitoring server 110 in order to determine if sets of metrics and their associated metric values received by the monitoring server 110 are normal or anomalous.

These metric thresholds may comprise a metric lower threshold and a metric upper threshold, indicating the minimum value a metric value can take and the maximum value a metric value can take, respectively, while still being considered normal. For example, a metric lower threshold for CPU cycles may be 100 cycles, and a metric upper threshold for CPU cycles may be 1000 cycles. A metric value corresponding to 200 CPU cycles would be considered normal by the monitoring server 110, as 200 CPU cycles is greater than 100 CPU cycles and less than 1000 CPU cycles. However, a metric value corresponding to 50 CPU cycles would be considered anomalous by the monitoring server 110, as 50 CPU cycles is less than the metric lower threshold of 100 CPU cycles.

In some embodiments, threshold module 116 may produce one or more metric deviation values. These metric deviation values may correspond to the deviation between a metric value and its corresponding metric threshold. The metric deviation values may be calculated using any appropriate method. For example, if the metric value associated with a CPU cycles metric is 48 CPU cycles, and the metric lower threshold is 100 CPU cycles, the metric deviation value for CPU cycles may be calculated based on the absolute value of the difference between 48 and 100, i.e., 52.

The monitoring server 110 may also use a machine learning module 118 in order to classify metrics or sets of metrics and their associated metric values as normal or anomalous. The machine learning module 118 may comprise one or more machine learning models. These machine learning models may be trained using sets of metrics and their associated metric values retrieved by the monitoring server 110 from the metrics database 112. The machine learning models may be supervised or unsupervised machine learning models. Examples of machine learning models include statistical models such as multivariate Gaussian distributions and replicator neural networks. The machine learning module 118 may use one or more machine learning models in order to produce a metric anomaly score indicating the likelihood that a particular metric or set of metrics and their associated metric values are anomalous. Metric anomaly scores may take on discrete or continuous ranges of values. For example, metric anomaly scoring may be binary, i.e., a metric anomaly score may be "anomaly" or "not anomaly." Metric anomaly scores may also take on a range of values, such as 1→100. The machine learning module 118 may also compare generated anomaly scores against anomaly score thresholds to determine if a set of metrics and their associated metric values are anomalous.

A set of metrics and their associated metric values may be identified as anomalous if one or more metrics of the set of metrics and their associated metric values are anomalous. In some embodiments, a set of metrics and their associated metric values may only be considered anomalous if all metrics and their associated metric values in that set are individually anomalous. In other embodiments, a set of metrics and their associated metric values may be considered anomalous if at least one metric and its associated metric value of that set of metrics and their associated values is anomalous. Metrics and their associated metric values may be co-anomalous, that is, two or more metrics and their associated metric values may not be considered anomalous individually (e.g., all metric values may be within their respective metric threshold ranges), but when their respective metric values are considered together (e.g., by a machine learning model) that set of metrics and their associated metric values may identified as anomalous by the monitoring server 110.

The monitoring server 110 may use the anomaly match module 120 to determine if a metric anomaly pattern corresponding to a current set of metrics and their associated metric values has been previously identified and stored in the metric anomaly database 114 by the monitoring server 110. The anomaly match module 120 may generate a metric anomaly pattern corresponding to metrics and their associated metric values stored in the metrics database 112. The anomaly match module 120 may use this metric anomaly pattern to identify a closest known anomaly pattern stored in the metric anomaly database 114. The metric anomaly pattern may comprise a temporally organized sequence of sets of metrics and their associated metric values, where at least one set of metrics and their associated metric values among the sequence of sets of metrics and their associated metric values is anomalous, e.g., having a metric anomaly score greater than a corresponding metric anomaly score threshold. As an example, the metric anomaly pattern may comprise 11 sets of metrics and their associated metric values, where the fourth and sixth set of metrics and their associated metric values are anomalous. Alternatively, the metric anomaly pattern may comprise 100 sets of metrics and their associated metric values, where only the $100^{th}$ set of metrics and their associated metric values are anomalous.

Metric anomaly patterns may be indicative of a sequence of sets of metrics and their associated metric values that results in an anomaly, and may be useful for forecasting potential anomalies. For example, an increase in used CPU cycles over ten consecutive time intervals may indicate that a monitored service is about to crash. As such, a metric anomaly pattern comprising some number of sets of metrics and their associated metric values with increasing CPU cycles may be used to forecast the impending crash.

In some embodiments, metric anomaly patterns stored in the metric anomaly database 114 may be stored in association with control instructions. These control instructions, when transmitted to the monitored computer 102, may cause the monitored computer 102 to perform functions, modify memory, execute processes, etc. These control instructions may be used to correct an issue causing a current anomaly or prevent a future anomaly. As an example, a metric anomaly pattern may indicate that monitored computer 102 will crash if monitored service 104 continues running. The anomaly pattern may be stored in the metric anomaly database 114 in association with a control instruction to terminate the operation of monitored service 104. Provided an auto-fix feature is enabled, the monitoring server 110 can retrieve the control instruction from the metric anomaly database 114 using the anomaly match module 120 and transmit the control instruction to monitored computer 102. Monitored computer 102 can then execute the control instruction in order to terminate monitored service 102.

The visualization module 122 may be used to generate visualizations for metrics, metric values, metric anomalies, and metric anomaly patterns. Security or operations teams 126 may view and interact with these visualizations (e.g., zoom in, zoom out, pan, etc.), in order to monitor the performance of the monitored computer 102 and the monitoring system itself.

The alerting module 124 may be used to issue alerts if the monitoring server 110 determines that a set of metrics and their associated metric values are anomalous. In some embodiments, the alerting module may generate a second anomaly score based on a weighted combination of a metric anomaly score generated by the machine learning module 118 and metric deviation values generated by the threshold module 116. The alerting module 124 may issue alerts if, for example, the second metric anomaly score exceeds an anomaly score threshold. Alerts may be issued by transmitting a message, such as an email, to a support mailbox. Members of security/operations team 128 or a security system can act on these alerts in order to fix any underlying issues with monitored computer 102 that may be causing the anomaly.

Figure 2:
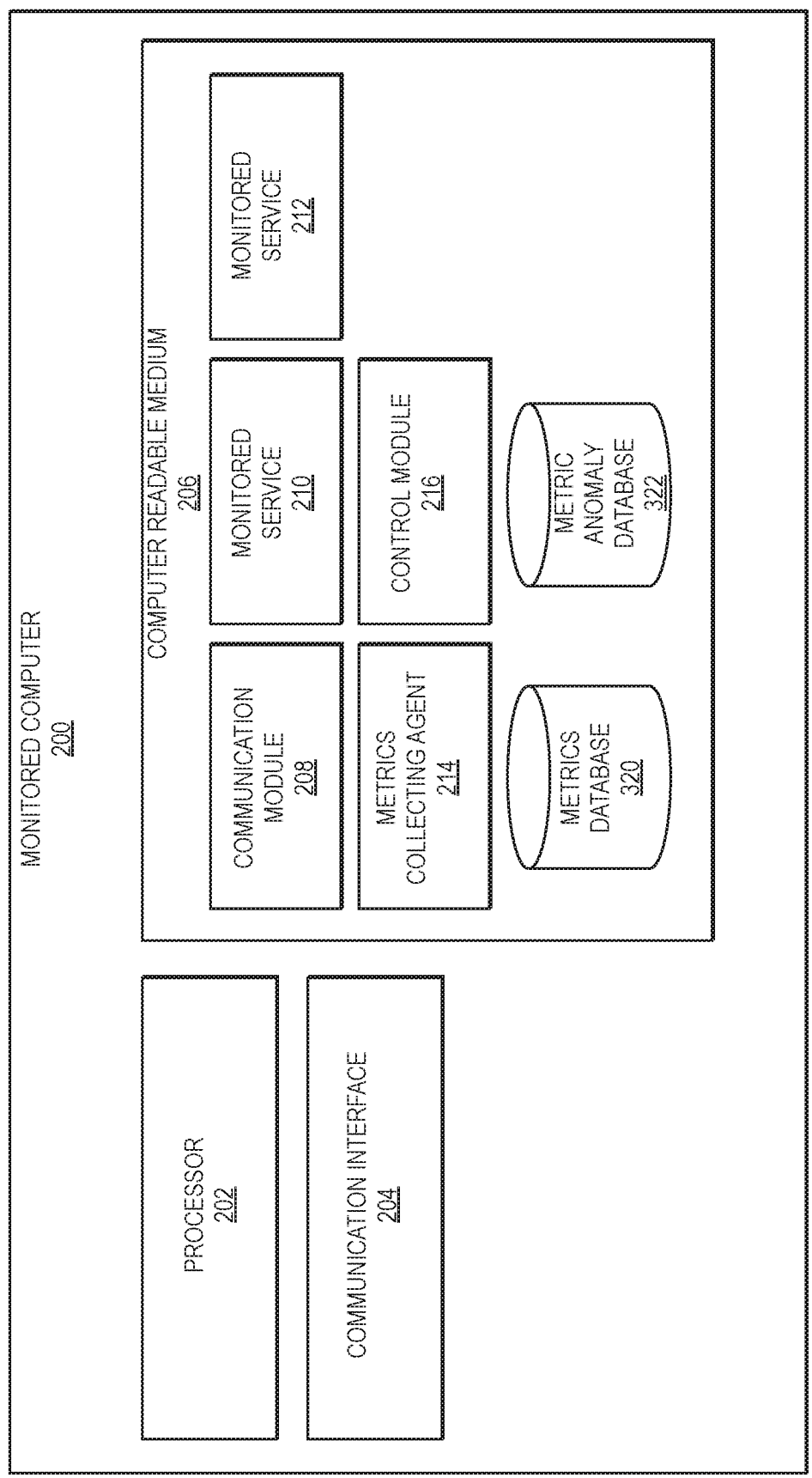
FIG. 2 shows a system block diagram of a monitored computer according to some embodiments.

Monitored computer 110 may be better understood with reference to FIG. 2, which shows a monitored computer 200 comprising a processor 202, a communication interface 204, and a computer readable medium 206. The computer readable medium 206 may store software modules including a communications module 208, monitored services 210 and 212, metrics collecting agent 214, and control module 216.

Processor 202 may be any suitable processing apparatus or device as described in the terms section above. Communications interface 304 may comprise a network interface that enables the monitored computer 200 to communicate with other computers or systems (e.g., the monitoring server) over a network such as the Internet.

Communication module 208 may comprise code or software, executable by processor 202 for establishing communication between monitored computer 200 and other entities, including the monitoring server. As an example, communications module 308 may comprise code enabling the generation of UDP (User Datagram Protocol) or TCP (Transmission Control Protocol) packets, or any other appropriate form of network communication. Monitored computer 200 may use the communications module 208 to transmit and receive data from entities, such as the monitoring server. These data may include sets of metrics and control instructions, such as instructions to pause or terminate monitored services 210 and 212.

Monitored services 210 and 212 may include software used to implement services. Examples of such services include database management services, network communication services, transaction evaluation services, etc. Monitored services 210 and 212 may make system calls or issue commands to the operating system of monitored computer

200. Although two monitored services 210 and 212 are shown, embodiments can be practiced with any number of monitored services.

Figure 6:
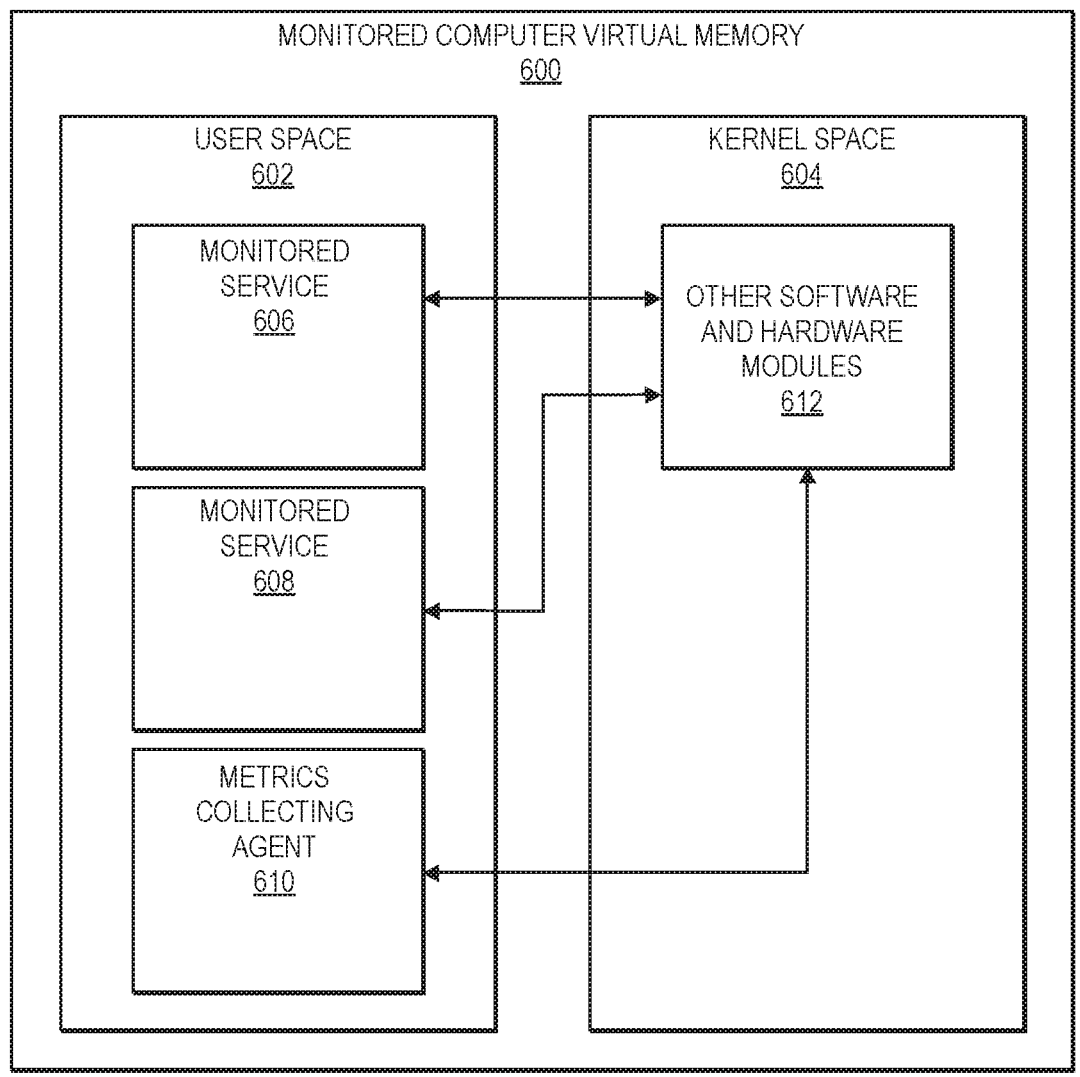
FIG. 6 shows a block diagram of monitored computer virtual memory according to some embodiments.

Metrics collecting agent 214 may include software used to implement a metrics collecting service that collects metrics and their associated metric values from other services, included monitored services 210 and 212. The metrics collecting agent 214 may be better understood with reference to FIG. 6 and the description of FIG. 6 presented below. In general, the metrics collecting agents 214 can retrieve and interpret metrics and their associated metric values from system calls made by the monitored services 210 and 212, or based on system activity data or system activities performed by the monitored services, or performed by other hardware or software modules that interface with the monitored services. For example, the metrics collecting agent 214 may communicate with a process scheduler operating from the operating system kernel of the monitored computer. The process schedule may determine how much CPU time is given to each monitored service. From the CPU time, the metrics collecting agent may determine the number of CPU cycles consumed by monitored services 210 and 212, which may be used as a metric value. When the metrics collecting agent 214 has collecting metrics and their associated metric values, it may combine the metrics into a set of metrics and a set of corresponding metric values, which may be formatted into an electronic message and sent to the monitoring server.

Control module 216 may include software used to execute control instructions received from the monitoring server. These control instructions may be used to fix an underlying issue that is causing anomalous metrics to be collected, such as a monitored service being executed in an undesirable or anomalous manner. Control module 216 may additionally comprise or include a security policy. The security policy may allow or deny capabilities associated with monitored services 210 and 212, such as network access, read and write permission, etc. Control module 216 may be used to pause or terminate the operation of monitored services 210 and 212 in response to receiving control instructions.

In some embodiments, these control instructions may comprise instructions to modify security policies included in control module 216. For example, a monitored service may be permitted to make certain commands or system calls, such as reading or writing to a particular file. However, the monitored service may be behaving anomalously, for example, repeatedly writing junk data to the same file. The control instruction may instruct a change to the security policy corresponding to that monitored service, removing the service's permission to read or write to that file. This change to the security policy may prevent the monitored service from behaving anomalously.

Monitoring servers according to embodiments may be better understood with reference to FIG. 3, which shows a monitoring server 300 comprising a processor 302, a communications interface 304, and a computer readable medium 306. The computer readable medium 306 may store software modules including a communications module 308, a threshold module 310, a machine learning module 312, an anomaly match module 314, an alerting module 316, and a visualization module 318. The computer readable medium 306 may also include two databases, a metrics database 320 and a metric anomaly database 322.

Processor 302 may be any suitable processing apparatus or device as described in the terms section above. The communications interface 304 may comprise a network interface that enables the monitoring server 300 to communicate with other computers or systems, including the monitored computer and a support mailbox, over a network such as the Internet. The communications interface 304 may also include hardware that enables a user to communicate with the monitoring server 300, e.g., via input output devices such as a keyboard, mouse, display, microphone, speakers, or other input/output devices.

Communication module 308 may comprise code or software, executable by processor 302 for establishing communication between monitoring server 300 and other entities, including the monitored computer and a support mailbox. Communications module 308 may comprise code enabling the generation of UDP (User Datagram Protocol) or TCP (Transmission Control Protocol) packets, or any other appropriate form of network communication. Monitoring server 300 may use the communication module 308 to transmit and receive data from entities, such as the monitored computer. These data may include sets of metrics, metric values associated with those sets of metrics, and control instructions.

Threshold module 310 may comprise code or software, executable by processor 302 for retrieving sets of metrics and their associated metric values from metrics database 320, determining metric thresholds, comparing received metric values against corresponding metric thresholds, and calculating metric deviation values.

Threshold module 310 may be used by monitoring server 300 to retrieve a number of sets of metrics and their associated metric values from the metrics database 320. In some embodiments, this number of sets of metrics and their associated metric values may be a predetermined number of sets of metrics and their associated metric values, e.g., 100 sets of metrics and their associated metric values. Each set of metrics and their associated metric values may correspond to a predetermined time period or time interval (e.g., a fifteen second time interval from 3:00:00 P.M. to 3:00:15 P.M. on Apr. 15, 2019). In some embodiments, the number of sets of metrics and their associated metric values may correspond to a number of most recent time intervals (e.g., the ten most recently collected sets of metrics). Threshold module 310 may comprise code, executable by processor 302 for enabling the monitoring server 300 to query or otherwise search the metric database 320 in order to retrieve the sets of metrics and their associated metric values, for example, using a query language such as the Structured Query Language (SQL).

Additionally, threshold module 310 may be used by monitoring server 300 to determine metric thresholds. The metric thresholds may comprise a metric lower threshold and a metric upper threshold. The metric thresholds may define the boundaries for a normal metric value. A metric may be considered normal if its corresponding metric value is greater than or equal to the metric lower threshold, and less than or equal to the metric upper threshold. The metric thresholds may correspond to each metric of a set of metrics. For an exemplary set of metrics comprising CPU cycles, heartbeats, and latency, the metric thresholds corresponding to that set of metrics may comprise a lower bound for CPU cycles, an upper bound for CPU cycles, a lower bound for heartbeats, an upper bound for heartbeats, a lower bound for latency, and an upper bound for latency.

In some cases, a metric threshold may comprise only a lower threshold or only an upper threshold, depending on the nature of the corresponding metric. A metric such as latency (a time interval between a stimulation and a response, e.g., the time interval between a message being transmitted and received) may have a metric upper threshold (indicating an unacceptably slow response) but have no corresponding metric lower threshold.

Further, threshold module 310 may comprise code allowing the monitoring server 300 to determine metric thresholds based on the number of sets of metrics and their associated metric values retrieved from the metrics database 320. Monitoring server 300 may determine these metric thresholds based on a set of metric value averages and a set of metric value standard deviations derived from the number of sets of metric values.

For example, monitoring server 300 may retrieve 100 sets of metrics and their associated metric values from the metrics database 320. These sets of metrics may each comprise a metric value corresponding to CPU cycles, heartbeats, and latency. For these 100 sets of metrics, monitoring server 300 may determine a metric average corresponding to CPU cycles using the 100 CPU cycle metric values, a metric average corresponding to heartbeats using the 100 heartbeat metric values, and a metric average corresponding to latency using the 100 latency metric values. The set of metric averages may comprise the metric average for CPU cycles, the metric average for heartbeats, and the metric average for latency. Likewise, the set of metric standard deviations may comprise the metric standard deviation for CPU cycles, the metric standard deviation for heartbeats, and the metric standard deviation for latency.

Continuing the example, threshold module 310 may comprise code enabling the monitoring server 300 to determine upper and lower metric thresholds based on the set of metric averages and the set of metric standard deviations. Additionally, the monitoring server may use a set of deviation multipliers. The set of deviation multipliers may be multiplied by the metric standard deviations to produce a set of metric standard deviation products. Each set of metric standard deviation products may be added to or subtracted from the set of metric value averages to produce the corresponding metric upper thresholds or metric lower thresholds respectively. For example, for a metric such as CPU cycles, the metric value average may be 100 CPU cycles, the metric value standard deviation may be 20 CPU cycles, and the deviation multiplier may be 1. The metric lower threshold may be calculated as 100−1*20=80 CPU cycles, and the metric upper threshold may be calculated as 100+1*20=120 CPU cycles. For a deviation multiplier of 2, the corresponding metric lower threshold would be 60 CPU cycles and the corresponding metric upper threshold would be 140 CPU cycles. Each metric may have its own deviation multiplier, e.g., CPU cycles may have a deviation multiplier of 2.5, while latency may have a deviation multiplier of 1.75. Another example of metric threshold calculation is discussed below with reference to FIG. 7.

In some embodiments, the set of metric thresholds may be additionally based on a prior set of metric thresholds. As an example, a set of metric thresholds may be determined based on the sets of metric averages and sets of metric standard deviations, and the set of metric thresholds may be averaged with the prior set of metric thresholds to determine a final set of metric thresholds. Threshold module 310 may additionally maintain a data file or configuration file containing prior sets of metric thresholds. These prior sets of metric thresholds may include an initial set of metric thresholds, which may have been determined by a subject matter expert.

Threshold module 310 may additionally comprise code, executable by processor 302 for generating a set of metric deviation values. The set of metric deviation values may be derived from current metric values and the set of metric thresholds. The set of metric deviation values may be calculated based on a difference between current metric values and the set of metric thresholds. For example, a current metric value of 300 CPU cycles may be compared against a metric upper threshold of 250 CPU cycles. The deviation value could be the difference or absolute value of the difference between the current metric value and the metric upper threshold (50 CPU cycles). As another example, the deviation value could be scaled based on the metric standard deviation corresponding to that current metric, for example, the standard deviation for CPU cycles could be 25 cycles, and the metric deviation value could be 50/25=2.

Machine learning module 312 may comprise code, executable by processor 302, for training and utilizing machine learning models in order to produce a metric anomaly score. As stated above, the metric anomaly score can be a measure of how normal or anomalous a set of metrics and their associated metric values are. The machine learning models can be trained using a plurality of sets of metrics and their associated metric values retrieved from metrics database 320. Any appropriate machine learning model or models can be used, including supervised and unsupervised models. Examples of machine learning models that may be used include maximum likelihood estimators for multivariate Gaussian distributions and replicator neural networks.

Maximum likelihood estimation is a method of estimating the parameters (mean, standard deviation, etc.) of a statistical model to maximize the probability of the observed data. In this case, the statistical model can be a multivariate Gaussian distribution, and the observed data may refer to training data, i.e., sets of metrics and their associated metric values retrieved from metrics database 320. The parameters to be estimated are a mean set of metrics and a covariance matrix. Covariance is a measure of the joint variability of two metrics, e.g., the joint variability between CPU cycles and latency. Often, two metrics may be dependent on one another. For example, an increase in latency may indicate a decrease in the quality of communication between the monitored computer and other computers, and may result in an increased number of dropped packets, thus, there may be a positive covariance between latency and number of dropped packets.

A metrics covariance matrix can have a row and column corresponding to each metric, and the value in the $i^{th}$ row and $j^{th}$ column could correspond to the covariance between the $i^{th}$ metric and the $j^{th}$ metric in a set of metrics, such as the covariance between CPU cycles and number of system calls, or the covariance between the open file descriptor of a particular monitored service and the number of minor faults, etc.

Once maximum likelihood estimation is complete (i.e., the mean vector and the covariance matrix are determined based on the sets of metrics retrieved from the metrics database 320), the current set of metrics and the set of current metric values associated with the set of current metrics can be evaluated. The machine learning module 312 can be used to calculate the probability of observing the current set of metrics and the current set of metric values based on the observed (training) data. A current set of metrics and a current set of metric values that are highly improbable are likely anomalous, while a current set of metrics and a current set of metric values that is extremely probable is likely normal. The machine learning module 312 may use a formula such as the formula below to calculate the probability associated with a current set of metrics and a current set of metric values, where k is the number of metrics in the current set of metrics, $\Sigma$ is the covariance matrix, $|\Sigma|$ is the determinant for covariance, x is the current set of metric values and $\mu$ is the mean set of metric values. T indicates the transpose operation and $\Sigma^{-1}$ is the inverse of the covariance matrix:

$$\frac{1}{(2\pi)^{k/2}|\Sigma|^{1/2}} e^{\left(-\frac{1}{2}(x-\mu)^T \Sigma^{-1}(x-\mu)\right)}$$

Maximum likelihood estimation of multivariate Gaussian distributions is advantageous because it can be performed without labelled training data. Additionally, a multivariate Gaussian distribution can be updated in constant time complexity, making it ideal for real time processing.

Another machine learning model that may be used is a replicator neural network. A replicator neural network is an unsupervised learning model that attempts to replicate its input (i.e., the set of current metric values it receives) at its output. The difference between the input and the output can be used to determine whether the current set of metrics and the set of current metric values is normal or anomalous. If the input and output are identical, the current set of metrics is highly predictable, and thus normal. If the input and output are very different, the current set of metrics is very unpredictable, and likely anomalous.

A replicator neural network, like other artificial neural networks is composed of connected neurons. These connected neurons may be organized into layers. For example, a replicator neural network may have five layers, an input layer, three hidden layers, and an output layer. Connected neurons have a weight between them that indicates the strength of the connection between those neurons. Training involves determining and adjusting the weights between the neurons until the replicator neural network is able to best replicate the training data at its output neurons. The weights between neurons may be calculated according to the formula below, where $w_{i,j}$ is the weight between neuron i and j, $d_i$ is the expected output of neuron i, $y_i$ is the actual output of neuron i and a is the learning rate:

$$w_{i,j}(t+1) = w_{i,j}(t) + \alpha(d_i - y_i)x_j(t)$$

Once the replicator neural network is trained, a current set of metrics and a current set of metric values can be applied as the input. The replicator neural network can produce an output set of metric values, which can be compared against the current set of metrics and the current set of metric values to produce an anomaly score. There are a number of ways in which the current set of metrics and the current set of metric values can be compared to the output set of metric values. The following is intended only as one non-limiting example.

The current set of metrics and the current set of metric values and the predicted or output set of metrics and their associated values could be interpreted as a vector, and the angle between the two vectors could be calculated, using, for example, the dot product. If the angle between the two vectors is zero, the current set of metrics and the current set of metric values and the output set of metrics and their associated values are identical. Consequently, the replicator neural network was able to perfectly replicate the current set of metrics and the current set of metric values, indicating normality. This may be represented by an anomaly score of zero. As the angle between the two vectors increases, the anomaly score may increase correspondingly. An angle of 90 degrees, for example, indicates that the predicted set of metrics and their associated values and the current set of metrics and the current set of metric values are orthogonal to one another, indicating that the replicator neural network did poorly at replicating the current set of metrics and the current set of metric values. This could correspond to an anomaly score of 1 (on a 0 to 1 anomaly score range) or 100 (on a 0 to 100 anomaly score range). Angles between zero and 90 degrees could be interpreted as anomaly scores on the 0 to 1 range or the 0 to 100 range, for example, an angle such as 30 degrees could correspond to an anomaly score of 0.33 or 33. The correspondence between angle and anomaly score may depend on the tolerance of the monitoring server 300. If there is a low tolerance for anomalies, small angles could correspond to higher anomaly scores (e.g., an angle of 10 degrees corresponds to an metric anomaly score of 0.7 on a 0 to 1 scale). Alternatively, if monitoring server 300 has a high tolerance for anomalies, large angles could correspond to lower metric anomaly scores (e.g., an angle of 60 degrees corresponds to a metric anomaly score of 0.5 on a 0 to 1 scale).

In some embodiments, the metric anomaly score may be combined (e.g., in a weighted combination) with a set of metric deviation values produced by threshold module 310 to produce a second metric anomaly score. There are numerous methods that may be used to produce a second metric anomaly score based on the set of metric deviation values and the metric anomaly score. The following is intended only as a single, non-limiting example.

The metric deviation values could be normalized to a similar range as the anomaly scores. If a metric anomaly score is in a 0 to 100 range, the metric deviation values could be normalized so that each metric deviation value is in the 0 to 100 range. The metric deviation values could then be averaged to produce a single metric deviation score. The metric deviation score and the metric anomaly score could each be weighted and combined to produce the second metric anomaly score. As an example, the metric deviation score may be given a 45% weight, and the metric anomaly score may be given a 55% weight.

To summarize, the machine learning module 312 may comprise code, executable by processor 302 for training machine learning models using sets of metrics and their associated metric values retrieved from metric database 320. These machine learning models may be used to evaluate current sets of metrics and current sets of metric values to produce metric anomaly scores.

Anomaly matching module 314 may comprise code or software, executable by processor 302 for determining metric anomaly patterns, identifying closest known metric anomaly patterns in the metric anomaly database 322, and storing metric anomaly patterns in the metric anomaly database 322. The anomaly matching module 314 may additionally comprise code or software for identifying control instructions corresponding to closest known anomaly patterns, and transmitting those control instructions to the monitored computer, in order to implement a fix to any issues causing the anomalous metrics.

As stated above, a metric anomaly pattern may comprise a sequence of sets of metrics and their associated metric values corresponding to an anomaly. For example, a metric anomaly pattern may comprise a sequence of sets of metrics and their associated metric values where one or more sets of metrics and their associated metric values have an anomaly score greater than an anomaly score threshold. Anomaly matching module 314 may comprise code enabling the monitoring server 300 to determine these metric anomaly patterns.

Metric anomaly patterns may be useful for forecasting anomalies. As an example, a metric anomaly pattern may comprise 19 sets of normal metrics and their associated normal metric values, followed by a set of anomalous metrics and their associated anomalous metric values. If monitoring server 300 observes 19 (or less) sets of normal metrics and their associated metric values matching the sets of normal metrics and their associated metric values in the metric anomaly pattern, the monitoring server 300 can predict that an anomalous set of metrics and their associated metric values may be received soon. Rather than issuing an alert when the anomalous set of metrics and their associated metric values are received, the monitoring server 300 can issue an alert before the anomalous set of metrics and their associated metric values are received, providing security and operations teams with foreknowledge of the impending anomaly.

Further, metric anomaly patterns may be useful for automatically issuing fixes to the monitored computer or monitored services. For certain known metric anomaly patterns, a known fix may exist that solves the underlying problem causing the anomalous metrics. As an example, a particular metric anomaly pattern may involve CPU usage increasing in successive time intervals for a monitored service corresponding to a video streaming service. The video streaming service may successively consume more and more CPU cycles per time interval until it prevents the operation of other monitored services on the monitored computer. However, it could be determined in advance (e.g., by a security or operations team) that throttling communications between the video streaming service and its client computers can reduce the load on the video streaming service, and consequently reduce the CPU cycles consumed, preventing the anomalous metrics and behavior. Provided that the auto-fix feature is enabled, in addition to issuing an alert, monitoring server 300 can automatically transmit a control instruction to the monitored computer, ordering the monitored computer to throttle communication between the video streaming service and its client computers, enabling the monitoring server 300 to fix issues or anomalous behavior without the intervention of human operators. This advantageous feature may be used in combination with the anomaly forecasting feature described above, allowing monitoring server 300 to automatically issue control instructions for forecasted anomalies in order to prevent issues before they occur.

The following is an example of a method to determine a metric anomaly pattern. Upon detecting a current set of metric and a current set of metric values with a high metric anomaly score (e.g., greater than an anomaly score threshold), the monitoring server 300, using the anomaly matching module 314, may retrieve recent sets of metrics and their associated metric values from the metrics database 320. These recent sets of metrics can be sets of metrics received by monitoring server 300 from the monitored computer before receiving the current set of metrics and the current set of metric values. The monitoring server 300 may order these recent sets of metrics and their associated metric values based on their respective time intervals, e.g., ordered from oldest to newest. The newest set of metrics and their associated metric values may be the anomalous current set of metrics and current set of metric values. Alternatively, the monitoring server 300 may wait a predetermined period of time before generating the metric anomaly pattern in order to collect additional sets of metrics and their associated metric values. For example, upon determining that the current set of metrics and the current set of metric values has a high metric anomaly score, the monitoring server 300 may wait an additional ten time intervals to collect an additional ten sets of metrics and their associated metric values from the monitored computer. The metric anomaly pattern may comprise ten sets of metrics and their associated metric values preceding the current set of metrics (and current set of metric values) and the ten sets of metrics and their associated metric values received after the current set of metrics. In some embodiments, the number of recent sets of metrics and their associated metric values may be equal to the predetermined number of sets of metrics and their associated metric values used to calculate metric thresholds (as described above with reference to the threshold module 310, and below with reference to FIGS. 5 and 7).

Further, anomaly matching module 314 may be used to identify a closest known anomaly pattern stored in metric anomaly database 322. The closest known anomaly pattern may comprise a metric anomaly pattern that is similar to the determined metric anomaly pattern. "Similarity" can be determined using any appropriate means to identify similarities or differences between two sets of data, such as the use of distance metrics. As an example, a first metric anomaly pattern may comprise the following metrics and associated metric values [CPU cycles: 50, CPU cycles: 100, CPU cycles 150], indicating that the CPU cycles metric value starts at 50 and then increases by 50 for two successive time intervals. A known anomaly pattern may comprise the following metrics and associated metric values [CPU cycles: 40, CPU cycles: 80, CPU cycles: 120], indicating that the CPU cycles metric value starts at 40 and then increases by 40 for two consecutive time intervals. The distance metric could, for example, correspond to a difference between the metric values corresponding to the first metric anomaly pattern and the known anomaly pattern, e.g.: $\sqrt{(40-50)^2+(80-100)^2+(120-150)^2}=37.52$. Other, more advanced methods may be used to calculate the distance metric between two metric anomaly patterns, i.e., using a distance metric such as hamming distance, Jaro-Winkler distance, Levenshtein distance, etc. As another alternative, the metric anomaly patterns could be converted into vectors and the similarity or difference between the metric anomaly patterns could be determined by calculating the angle between the two vectors.

The closest known anomaly pattern may be the anomaly pattern with the lowest distance metric relative to the identified metric anomaly pattern. Using anomaly matching module 314, monitored server 300 may calculate a distance metric for the identified metric anomaly pattern and each metric anomaly pattern stored in the metric anomaly database 322. Monitored server 300 may identify the anomaly pattern stored in the metric anomaly database 322 with the smallest or lowest distance metric and may identify that anomaly pattern as the closest known anomaly pattern. This is intended only as a non-limiting example of identifying the closest known anomaly pattern, there are many optimizations that may be used to improve the efficiency of determining the closest known anomaly pattern, e.g., pre-pruning the database to avoid calculating distance metrics for unlikely matches, etc.

Using anomaly matching module 314, monitoring server 300 can identify or retrieve control instructions corresponding to the closest known anomaly pattern from the metric anomaly database 322. These control instructions may be stored in association with the closest known anomaly pattern, as an example, the metric anomaly database 322 may be a relational database storing control instructions in relation to their corresponding anomaly patterns. The control instructions retrieved from metric anomaly database 322 can be transmitted to the monitored computer using the anomaly matching module 314, communication module 308, and communications interface 304. The monitored computer can then implement these control instructions using a control module, as described above with reference to FIG. 2.

Alerting module 316 may comprise code, executable by processor 302 for issuing alerts based on metric anomaly scores, metric anomaly thresholds, metric anomaly patterns, etc. The alerting module 316 may comprise code enabling the monitoring server 300 to compare metric anomaly scores to metric anomaly thresholds to determine if alerting conditions are met. Additionally, the alerting module 316 may comprise code enabling the monitoring server 300 to issue an alert if a metric value is determined to be anomalous by threshold module 310. The monitoring server 300 may transmit these alerts using communication module 308 and communications interface 304. These alerts may be issued, for example, by transmitting a message to a support mailbox associated with a security and operation team, e.g., support mailbox 128 from FIG. 1, or to a system that can fix any anomalies automatically.

Visualization module 318 may comprise code or software, executable by processor 302 for rendering visualizations of metrics, metric anomalies, metric anomaly patterns, and alerts that may be viewed by members of a security or operations team. These visualizations may be better understood with reference to FIG. 4, which shows an exemplary visualization 400 according to some embodiments. Visualizations may be useful to system administrators and security or operations teams. These users may use visualizations to identify trends and shifts in metric patterns. Further, visualizations can act as a form of assurance to executives and customers, indicating that monitored services or monitored computers are functioning as intended and are well-monitored.

Visualization 400 comprises a header bar 402 and a display 414. The header bar 402 may comprise a title 404 (i.e., "DETECTED ANOMALIES") and user interface buttons 406-412, including a "zoom in" button 406, a "zoom out" button 408, a "configuration" button 410, and a "remove" button 412. Visualization 400 may be used by operations teams or security teams to monitor the performance of a monitored service or a monitored computer. Visualization 400 may be generated by a visualization module operated by a monitoring server. Visualization 400 may be displayed by the monitoring server (e.g., on a built-in display) or may be streamed or otherwise transmitted to an external display.

In the exemplary visualization 400, the display 414 shows a graph of detected anomalies from 3:10 P.M. to 3:15 P.M. Visualization 400 may be useful for the security or operations team to monitor the performance of a service. For example, the large increase in detected anomalies between 15:11 and 15:12 may indicate that some event (such as a Distributed Denial of Service attack) is occurring that may require the attention of the operations or security team. Likewise, the drop in detected anomalies between 15:13 and 15:14 may indicate that the event has passed, and the security or operations team no longer needs to be concerned with the current state of the monitored service.

It should be understood that the display 414 may take many forms, and is not restricted to a graph of anomalies versus time. Other examples of visualizations include pie charts (e.g., displaying the proportion of high anomaly scores, medium anomaly scores, and low anomaly scores for anomalies detected over the past hour), choropleth map (i.e., a map of a region, such as a continent, subdivided into areas, such as countries, shaded in different colors to convey information to the viewer), graph visualizations (such as network graphs), etc. Likewise, it should be understood that user interface elements 406-412 may depend on the nature of the display 414. For example, displays such as line graphs, choropleth maps, or network graphs may use user interface elements such as zoom in button 406 and zoom out button 408, while pie charts may use a different set of user interface elements.

Returning to FIG. 3, metrics database 320 may be any appropriate database or memory structure for storing sets of metrics and their associated metric values. These sets of metrics and their associated metric values may be stored in association with time intervals, corresponding to the period of times when the sets of metrics and their associated metric values were collected. The monitoring server 300 may store sets of metrics (e.g., a current set of metrics) and their associated metric values (e.g., a set of current metric values) received from the monitored computer in the metrics database 320 in association with their corresponding time interval. The monitoring server may retrieve sets of metrics and their associated metric values from metrics database 320 in order to determine metric thresholds, as described above. Metric anomaly database 322 may be any appropriate database or memory structure for storing metric anomaly patterns and corresponding control instructions. These metric anomaly patterns may comprise multiple sets of metrics and their associated metric values organized sequentially by time interval. Metric anomaly patterns may be retrieved from the metric anomaly database 322 in order to identify a closest known anomaly pattern and any control instructions associated with the closest known anomaly pattern, as described above.

Figure 5A:
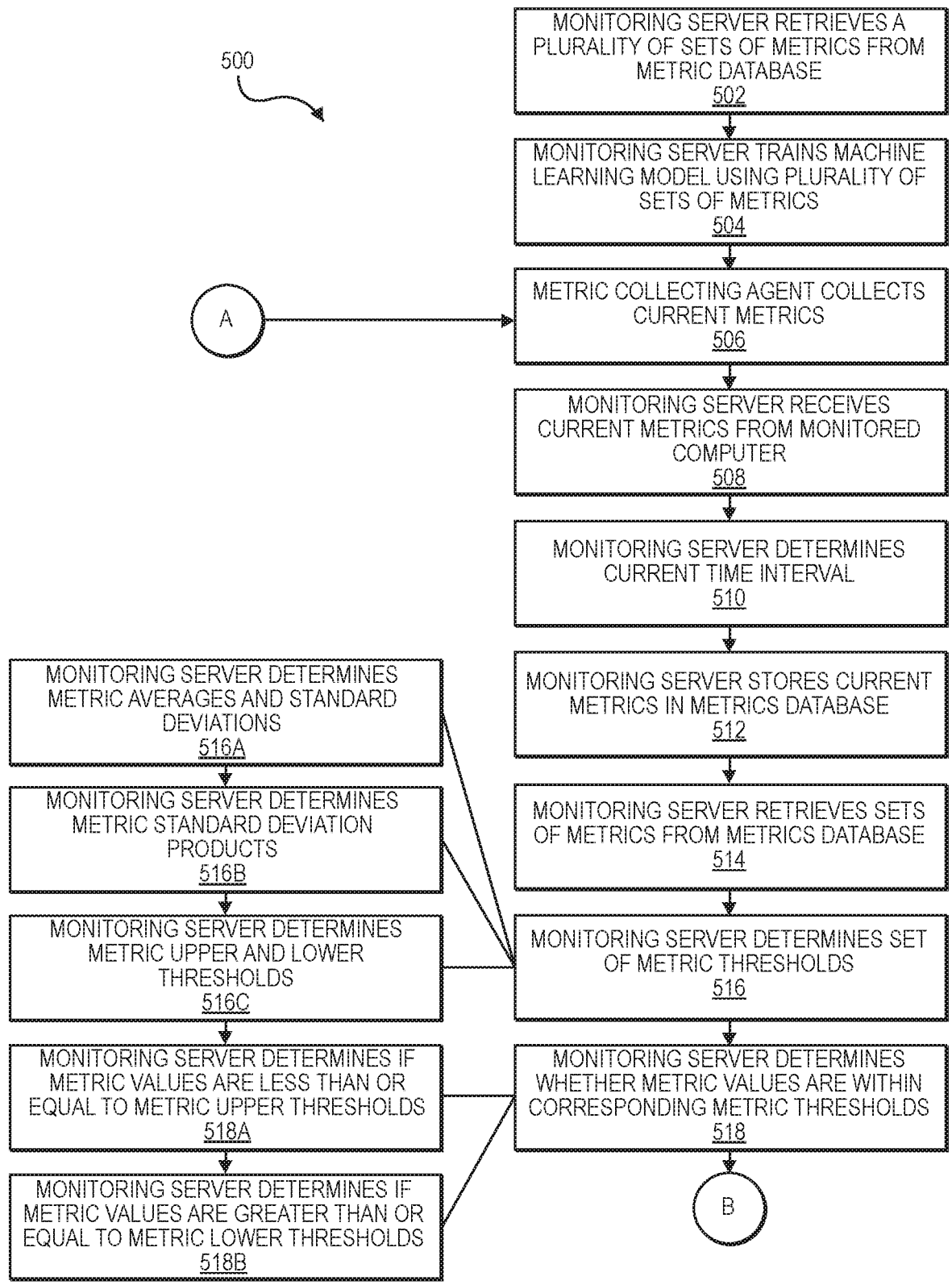
FIGS. 5A-C show an exemplary method of anomaly detection and alerting according to some embodiments.
Figure 5B:
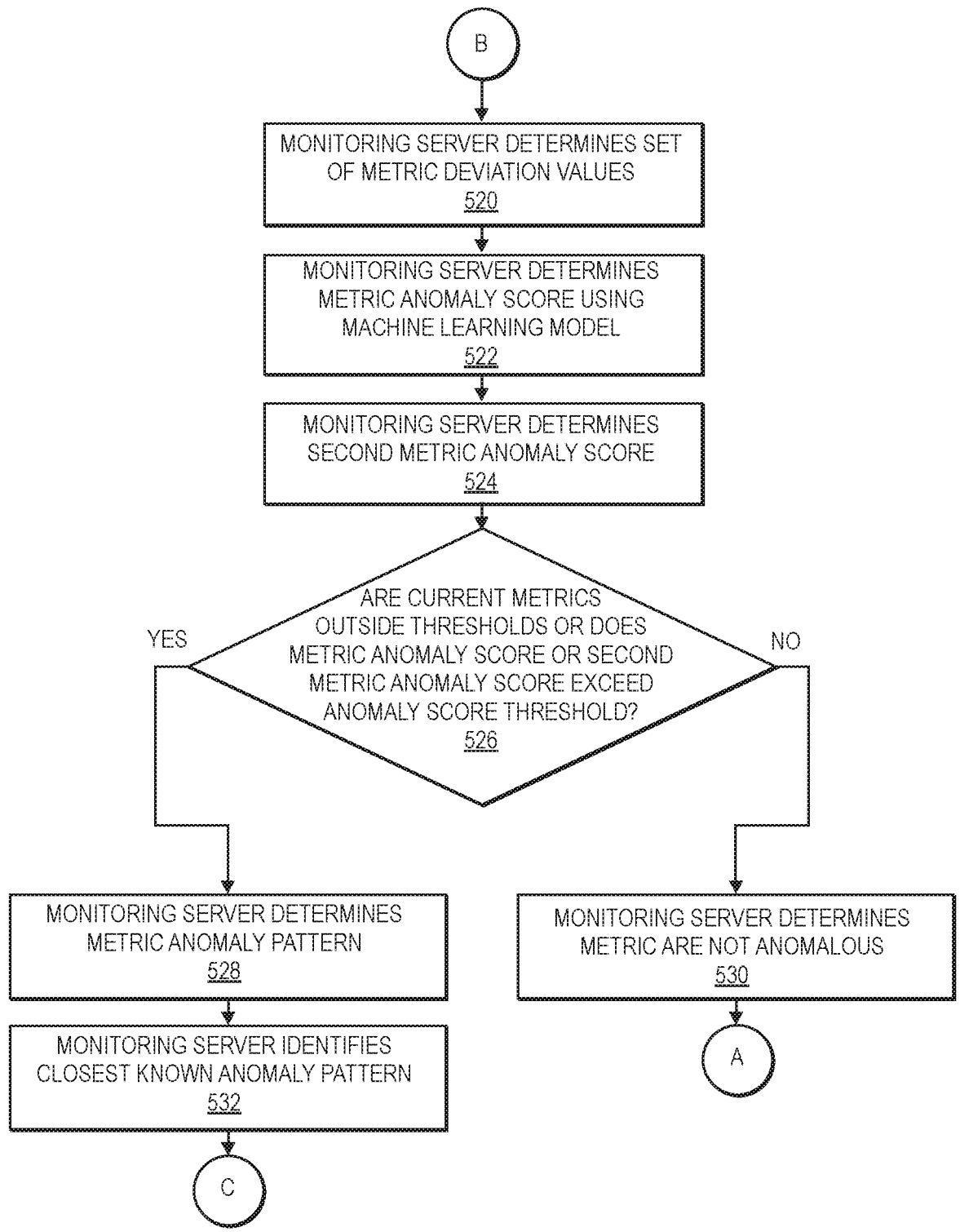
Figure 5C:
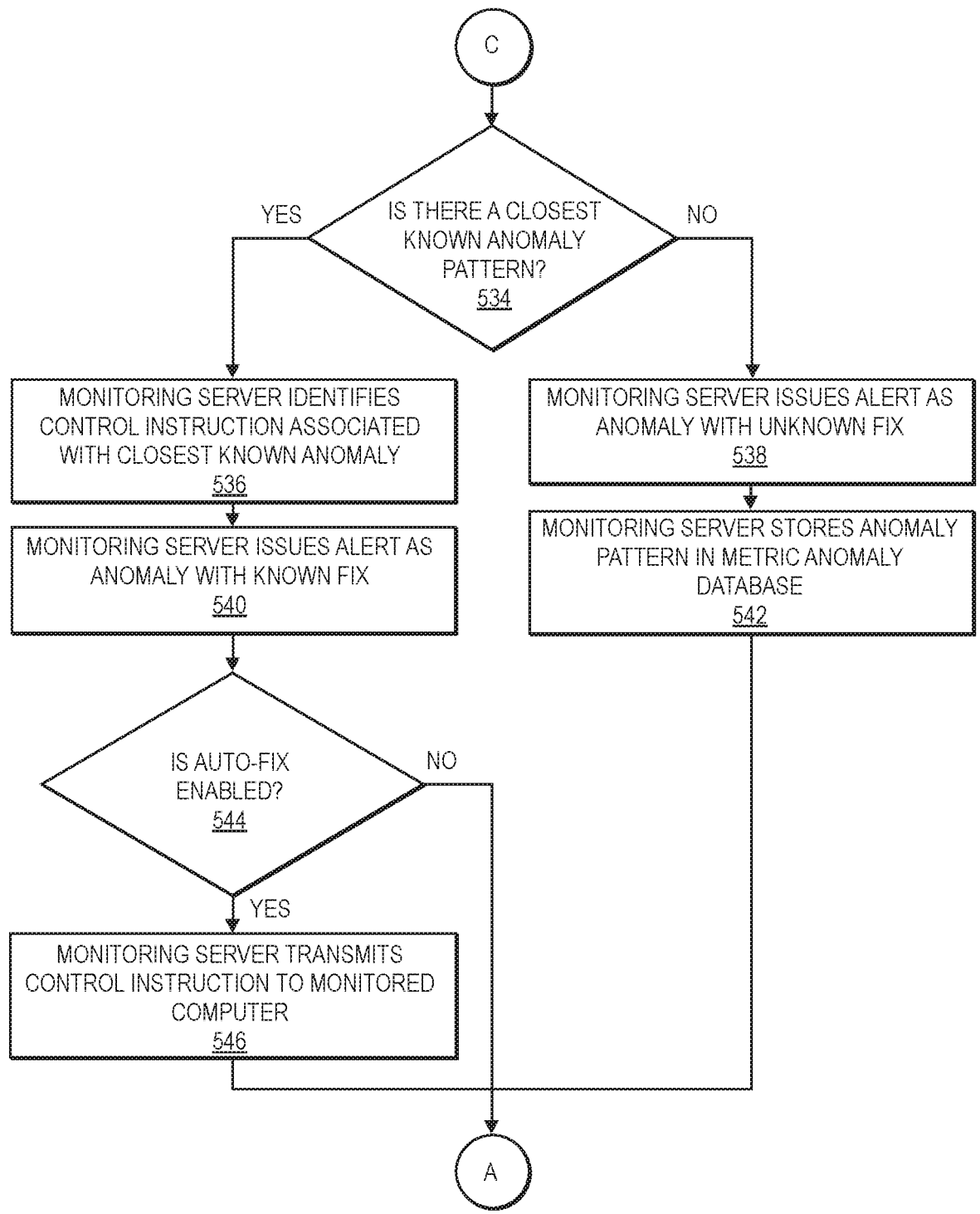

FIGS. 5A-C show a method 500 of anomaly detection and alerting according to some embodiments.

At step 502, the monitoring server can retrieve a plurality of sets of metrics and their associated metric values from the metrics database. These plurality of sets of metrics and their associated metric values may be used as training data to train machine learning models to identify a current set of metrics and a current set of metric values as normal or anomalous. The plurality of sets of metrics and their associated metric values may be retrieved from the metrics database using any appropriate method, for example, using a query that conforms to the Structured Query Language (SQL). The monitoring server may query the database for sets of metrics and their associated metric values tagged as training data, or sets of metrics and their associated metric values corresponding to a particular time interval, such as sets of metrics received from the monitored computer over the last hour, day, week, etc.

At step 504 the monitoring server may train the machine learning model using the plurality of sets of metrics and their associated metric values as training data. In some embodiments, the plurality of sets of metrics and their associated metric values may be unlabeled, i.e., there is no predetermined anomaly score corresponding to that particular set of metrics. In other embodiments, the plurality of sets of metrics and their associated metric values can be labelled with corresponding anomaly scores. The corresponding anomaly score labels may be binary (e.g., "anomaly" and "not anomaly") or non-binary (e.g., a range of values from 0 to 100). This labelling may have been performed by a human operator or an automated labelling service. The plurality of sets of metrics and their associated metric values can correspond to recent time intervals. For example, the plurality of sets of metrics and their associated metric values could correspond to the 1000 most recent 60 second time intervals, covering metric collected over the last 1000 minutes. However, it should be understood that any appropriate method of selecting the plurality of sets of metrics and their associated metric values can be employed.

In some embodiments, the machine learning model may be trained continuously while the monitoring server receives metrics and their associated metric values from the monitored computer. However, in some cases, the machine learning model may be trained periodically (e.g., nightly), or the machine learning model may be trained separately (e.g., by a computer system other than the monitoring server) and uploaded or otherwise transmitted to the monitoring server. This may be advantageous when there is a high computational cost associated with training the machine learning model.

The nature of machine learning model training depends greatly on the machine learning model being employed. The description of machine learning module 312 from FIG. 3 above provide examples of machine learning models that may be used and how those machine learning models may be trained.

At step 506, the metrics collecting agent, operating on the monitored computer may collect current metrics and current metric values corresponding to one or more monitored services. Step 506 may be better understood with reference to FIG. 6.

FIG. 6 shows the monitored computer virtual memory 600 subdivided into two spaces, user space 602, and kernel space 604. User space 604 comprises the virtual memory accessible to programs operating on the monitored computer, i.e., monitored services 606 and 608 and metrics collecting agent 610. Kernel space 604 comprises virtual memory reserved for the operating system kernel, the computer program that controls the monitored computer and executes the operating system. Kernel space 606 comprises other software and hardware modules 612 (e.g., the hard drive, the process scheduler, etc.).

In order to execute their respective functions, monitored services 606 and 608 may make system calls and commands to the kernel in order to access other software and hardware modules 612. The metrics collecting agent 610 can retrieve system level activity data, such as which system calls and commands are made by monitored services 606 and 608 from the other software and hardware modules 612. For example, the hard drive could store a log file containing the system calls made by monitored services 606 and 608. After retrieving this data, the metrics collecting agent 610 can extract the relevant metrics and format them into a suitable file for transmission to the monitoring server.

Returning to FIG. 5A, at step 508, the monitoring server receives the set of current metrics and the set of current metric values corresponding to the set of current metrics from the monitored computer, e.g., via the metrics collecting agent. The monitoring server may receive the current metrics and the current metric values over a network such as the Internet, or via a web API, as described with reference to FIG. 1 above.

At step 510, the monitoring server can determine a current time interval. The current time interval may correspond to the time interval over which the current metrics and the current set of metric values were captured. The current time interval may comprise a collection of timestamps, or a collection of timestamp ranges. For example, the current time interval may comprise the timestamps "Apr. 15, 2019 11:50:00 P.M." and "Apr. 15, 2019 11:51:00 P.M." indicating that the current time interval comprises a one minute period from 11:50 to 11:51 P.M. on Apr. 15, 2019. In some embodiments, the current time interval may be contained in the message received from the metrics collecting agent, i.e., the message containing the current metrics and the set of current metric values. In other embodiments, the monitoring server may determine the current time interval itself, e.g., based on its own system clock and the elapsed time between receiving the current set of metrics and the current set of metric values and a previous set of metrics and their associated metric values.

At step 512, the monitoring server can store the set of current metrics and the set of current metric values in the metrics database in association with the current time interval. This enables the monitoring server to retrieve the current set of metrics and the current set of metric values at a later time, for example, at a future time when the current set of metrics and the current set of metric values can be used to calculate metric thresholds.

At step 514, the monitoring server can retrieve a predetermined number of sets of metrics and their associated metric values from the metrics database, wherein the predetermined number of sets of metrics and their associated metric values corresponds to a predetermined number of time intervals. For example, the monitoring server can query the metric database for the 100 most recently received sets of metrics and their associated metric values. If each time interval is 1 minute long, and the current metrics and their associated metric values correspond to the time interval from 11:58 P.M. to 11:59 P.M., the 100 most recently received set of metrics and their associated metric values may correspond to the 100 one minute time intervals from 10:18 P.M. (100 minutes before 11:58) to 11:58 P.M.

At step 516, the monitoring server can determine a set of metric thresholds corresponding to the set of current metrics and the current set of metric values, wherein the set of metric thresholds are determined based on the predetermined number of sets of metrics and their associated metric values. In some embodiments, the set of metric thresholds may be calculated based on sets of metric averages and sets of metric standard deviations determined from the predetermined number of sets of metrics and their associated metric values. These embodiments may be better understood with reference to sub-steps 516A-C.

At sub-step 516A, the monitoring server determines a set of metric averages and a set of metric standard deviations based on the predetermined number of sets of metrics and their associated metric values. This may involve calculating the metric average and metric standard deviation corresponding to each metric of the predetermined number of sets of metrics and their associated metric values. As an example, if each set of metrics comprises the metrics "CPU cycles," "memory allocated," and "heartbeats," the average CPU cycles, memory allocated, and heartbeats may be calculated from the predetermined number of sets of metrics. Likewise, the standard deviation for each metric of the sets of metrics and their associated metric values may be calculated. The set of metric averages and the set of metric standard deviations may comprise these individually calculated metric averages and metric standard deviations.

At sub-step 516B, the monitoring server determines a set of metric standard deviation products by multiplying each metric standard deviations of the set of metric standard deviations by a corresponding deviation multiplier of a set of deviation multipliers. As an example of this calculation, the metric standard deviation for CPU cycles may be 20 cycles and the deviation multiplier for CPU cycles may be 1.5. The metric standard deviation product for CPU cycles may be determined by 20*1.5=30 CPU cycles. The metric standard deviation product for each metric standard deviation of the set of metric standard deviations may be calculated in a similar way. Notably, each metric may have a distinct deviation multiplier. For example, the deviation multiplier for received heartbeats may be less than the deviation multiplier for latency.

At sub-step 516C, the monitoring server can determine a set of metric upper thresholds by summing the set of metric averages and the set of metric standard deviation products, and determine a set of metric lower thresholds by determining a difference between the set of metric averages and the set of metric standard deviation products. The set of metric thresholds, referred to in step 516, may comprise the metric upper thresholds and metric lower thresholds corresponding to each metric, for example, the metric upper and lower threshold for CPU cycles, the metric upper and lower threshold for latency, etc. For an exemplary metric such as CPU cycles, the average CPU cycles from the set of metric averages may be 200 CPU cycles over a given time interval. The metric standard deviation product corresponding to CPU cycles may be 30. As such, the metric lower threshold may be equal to 200−30=170 CPU cycles, and the metric upper threshold corresponding to CPU cycles may be equal to 200+30=230 CPU cycles.

At step 518, the monitoring server can determine whether each current metric value of the set of current metric values corresponding to the set of current metrics is within corresponding metric thresholds of the set of metric thresholds. For example, for a metric such as CPU cycles, the metric value corresponding to that metric could be equal to 280 CPU cycles. The monitoring server can check each current metric value corresponding to the set of current metrics against the corresponding metric thresholds determined in step 516. This may comprise verifying that the current metric value is less than or equal to the metric upper threshold and greater than or equal to the metric lower threshold, see sub-steps 518A and 518B.

At sub-step 518A, the monitoring server can determine whether each current metric value of the set of current metric values is less than or equal to each metric upper threshold of the set of metric upper thresholds. For example, if the current metrics include the metrics CPU cycles, memory allocated, and heartbeats, the monitoring server can compare the current metric values corresponding to CPU cycles, memory allocated, and heartbeats (e.g., 280 CPU cycles, 200 MB allocated, and 3 heartbeats) against the corresponding metric upper thresholds. This can be accomplished by subtracting the current metric values from the metric upper thresholds and determining whether the result is a positive number (indicating that the metric upper threshold is greater than the corresponding current metric value) or a negative number (indicating that the metric upper threshold is less than the corresponding current metric value).

At sub-step 518B, the monitoring server can determine whether each current metric value of the set of current metric values is greater than or equal to each metric lower threshold of the set of metric lower thresholds. For example, if the current metrics include the metrics CPU cycles, memory allocated, and heartbeats, the monitoring server can compare the current metric values corresponding to CPU cycles, memory allocated, and heartbeats against the corresponding metric lower thresholds. This can be accomplished, for example, by subtracting the metric lower threshold from the current metric values and determining whether the result is a positive number (indicating that the metric lower threshold is less than the corresponding current metric value) or a negative number (indicating that the metric lower threshold is greater than the corresponding current metric value).

If the monitoring server determines that one or more of the current metric values corresponding to the set of current metrics are less than the corresponding metric lower threshold or are greater than the corresponding metric upper threshold, the monitoring server may determine that the current set of metrics are anomalous. Otherwise, if the current metric values are all within the metric upper and lower thresholds, the monitoring server may determine that the current set of metrics are normal.

Figure 7:
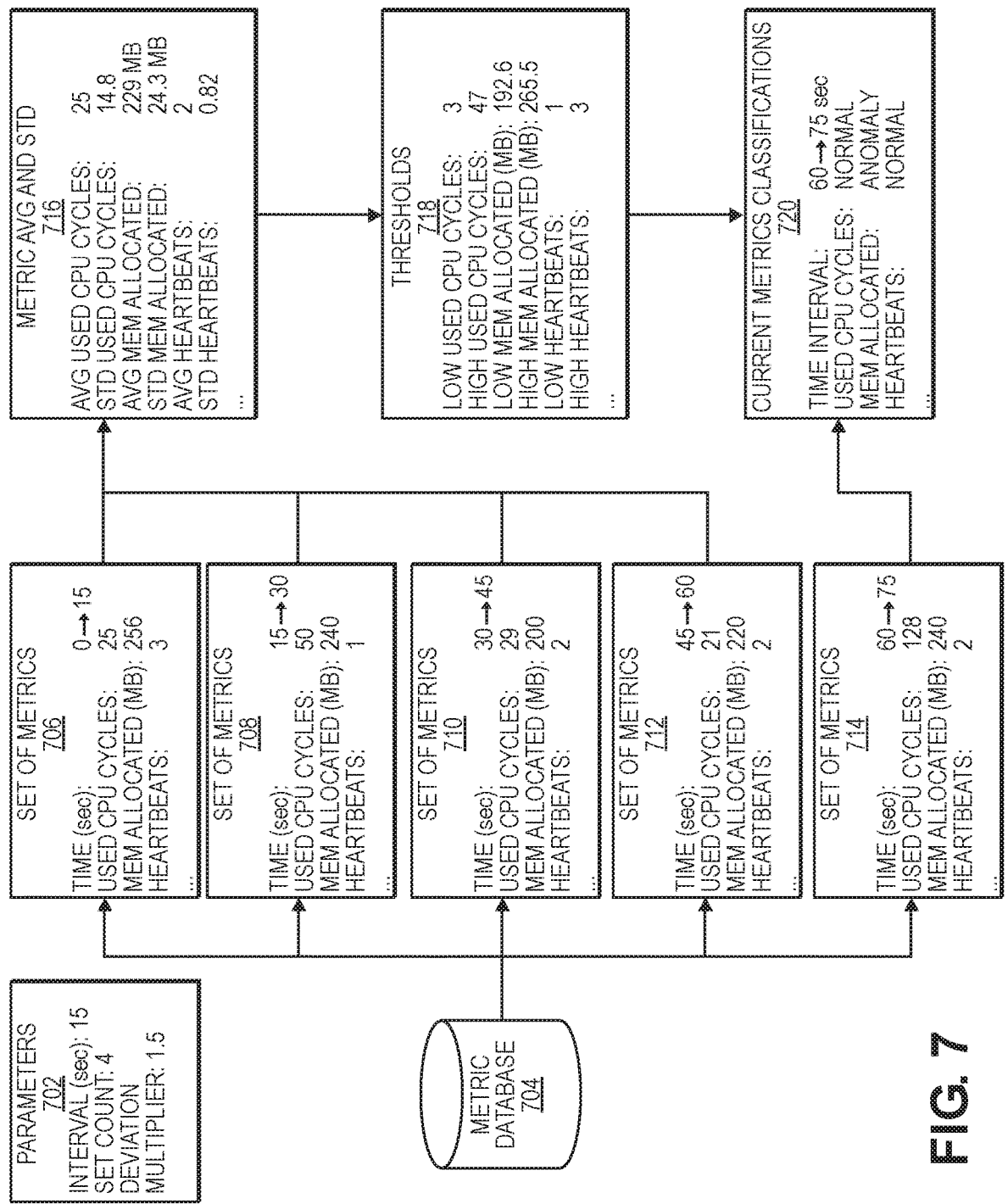
FIG. 7 shows an exemplary calculation of metric thresholds and metric anomaly classification according to some embodiments.

Steps 516A-516C, 518A, and 518B may be better understood with reference to FIG. 7, which illustrates a hybrid diagram of a method of determining a set of metric thresholds based on a predetermined number of sets of metrics retrieved from metrics database 704, and determining whether the metric values are within the determined set of metric thresholds.

Parameters 702 may be used to determine the metric thresholds. Parameters 702 may include the length of the time interval corresponding to each set of metrics and their associated metric values (15 seconds), the predetermined number (the set count, 4) of sets of metrics and their associated metric values used to determine the metric thresholds, and the deviation multiplier (1.5). Note that although one deviation multiplier is shown, in some embodiments, each metric may have a corresponding deviation multiplier.

Five sets of metrics and their associated metric values are shown, sets of metrics 706-712 correspond to the predetermined number of sets of metrics used to determine the metric thresholds. Set of current metrics 714 and current metric values comprise the set of metrics and their associated metric values recently received from the monitored computer that can be classified as normal or anomalous. As shown in FIG. 7, set of metrics and their associated metric values 706-712 collectively comprise a one minute period from time 0 seconds to 60 seconds. The set of current metrics 714 and the current metric values comprise a fifteen second period from 60 seconds to 75 seconds. Each set of metrics and their associated metric values 706-712 and the current set of metrics and their associated metric values 714 comprises the metrics used CPU cycles, memory allocated (in MB), and heartbeats, among other metrics and their associated metric values not shown.

From the sets of metrics and their associated metric values 706-712, the set of metric averages and the set of metric standard deviations 716 can be calculated. This can be accomplished using any number of known techniques for calculating averages and standard deviations. Using the set of metric averages, the set of metric standard deviations, and the deviation multiplier, the metric upper and lower thresholds for each metric can be calculated. Each metric standard deviation of the set of metric standard deviations can be multiplied by the deviation multiplier (1.5) to produce a set of metric standard deviation products. E.g., the metric standard deviation for used CPU cycles can be multiplied by the deviation multiplier to produce a used CPU cycle standard deviation product of 22.2. The lower threshold for CPU cycles can be calculated by subtracting the used CPU cycle standard deviation product from the average used CPU cycles, 25−22.2=2.8. As CPU cycles is an integer quantity, the result is rounded to produce the lower threshold of 3 CPU cycles shown in thresholds 718. Likewise, the upper CPU cycle threshold can be calculated by summing the average CPU cycles and the CPU cycle standard deviation product, 25+22.2=47.2. The result is likewise rounded to produce the upper threshold of 47 CPU cycles shown in thresholds 718. A similar process can be used to determine the metric lower threshold and metric upper threshold corresponding to memory allocation and heartbeats respectively.

The set of current metrics and the current metric values 714 can be compared against the set of metric thresholds. This may be accomplished by comparing each current metric and its associated current metric value of the set of current metrics and the current metric values to its corresponding metric threshold. In FIG. 7, both the used CPU cycles and heartbeats in the set of current metrics and current metric values 714 are within their corresponding metric thresholds. The metric value associated with the memory allocated metric for the current set of metrics and the current metric values 714 (128 MB) however, is less than the metric lower threshold for memory allocated (192.6 MB). As such, the current metric classification 720 reports that used CPU cycles and heartbeats are normal, while memory allocated is anomalous.

Returning to the method 500, at step 520 (see FIG. 5B), the monitoring server may determine a set of metric deviation values derived from the set of current metric values and the set of metric thresholds. In some embodiments, these deviation values may be the difference between the metric value and the corresponding metric threshold. For example, for a metric value corresponding to CPU cycles equal to 280 CPU cycles, and a metric upper threshold corresponding to CPU cycles equal to 230 CPU cycles, the metric deviation value for CPU cycles may be equal to 280−230=50 CPU cycles. A metric deviation value may likewise be calculated for each metric of the set of current metrics. For additional description of metric deviation values, refer to the description of the threshold module 310 of FIG. 3 above.

At step 522, the monitoring server can determine a metric anomaly score by applying the set of current metric values corresponding to the set of current metrics as inputs to a machine learning model. The machine learning model may determine the metric anomaly score based on the type of machine learning model being used. For example, a replicator neural network may attempt to replicate the input (the set of current metrics) at its output, and may determine a metric anomaly score based on the difference between the input and the output, e.g., using distance metrics. If the difference is small, the replicator neural network may determine a small metric anomaly score, and if the difference is large, the replicator neural network may determine a large metric anomaly score. Alternatively, a model such as a multivariate Gaussian distribution may determine a metric anomaly score based on the probability of observing the set of current metric values based on the training dataset.

At step 524, the monitoring server can determine a second metric anomaly score based on a weighted combination of the metric anomaly score and a set of metric deviation values derived from the set of current metric values and the set of metric thresholds. As described above with reference to FIG. 3, there are numerous ways by which the metric anomaly score could be combined with the metric deviation values. As one example, the metric deviation values could be normalize to a similar range as the metric anomaly score. The metric deviation values could be averaged to produce a single metric deviation score that can then be weighted and combined with the metric anomaly score. As an example, the metric deviation score could be 30, and the metric anomaly score could be 50. If the metric deviation score is given a 25% weight and the metric anomaly score is given a 75% weight, the second metric anomaly score could be calculated as 30*0.25+50*0.75=45.

At step 526, the monitoring server may determine whether the set of current metrics and the set of current metric values are anomalous. The monitoring server may accomplish this by determining whether the set of current metrics and the set of current metric values are outside the metric thresholds, whether the metric anomaly score exceeds a metric anomaly score threshold, or whether the second metric anomaly score exceeds the metric anomaly score threshold. If the sets of current metrics and the set of current metric values are outside the corresponding metric thresholds, or either the metric anomaly score or second anomaly score exceed the metric anomaly score threshold, the monitoring server can determine the set of current metrics and the set of current metric values are anomalous, and proceed to step 528 to determine the metric anomaly pattern. If the sets of current metrics and the set of current metric values are not anomalous, the monitoring server can proceed to step 530.

At step 528, the monitoring server can determine a metric anomaly pattern corresponding to the set of current metrics, the set of current metric values, and the predetermined number of sets of metrics and their associated metric values. As described above with reference to FIG. 3, the monitoring server can retrieve the predetermined number of sets of metrics and their associated metric values from the metrics database, then determine the metric anomaly pattern as a sequence of the predetermined number of sets of metrics and their associated metric values and the set of current metric and the set of current metric values, organized by time interval. For example, if the predetermined number of sets of metrics and their associated metric values comprises nine sets of metrics and associated metric values, the metric anomaly pattern may comprise the nine sets of metrics and their associated metric values, ordered from oldest to newest, followed by the set of current metrics and the set of current metric values. The metric anomaly pattern can be used to characterize the sequence of events leading up to the anomalous current metrics and the current metric values, and can be used to identify a control instruction that can be used to fix any issues with the monitored computer that may be causing the anomalous set of current metrics and the set of current metric values.

At step 530, based on the determination in step 526, the monitoring server can determine that the current set of metrics and the set of current metric values are not anomalous. As the current set of metrics and the set of current metric values are not anomalous, the monitoring server does not need to issue any alerts. The monitoring server can proceed back to step 506 in FIG. 5A, and wait to receive a new current set of metrics and a new set of current metric values from the monitored computer.

At step 532, the monitoring server can identify a closest known anomaly pattern in a metric anomaly database. As described above with reference to anomaly matching module 314 from FIG. 3, the monitoring server can compare the metric anomaly pattern determined in step 528 against metric anomaly patterns stored in the metric anomaly database. The monitoring server can calculate a distance metric between the determined metric anomaly pattern and some or all of the metric anomaly patterns stored in the metric anomaly database. The metric anomaly pattern with the lowest distance metric, or with a distance metric less than a distance metric threshold may be identified as the closest known anomaly pattern.

At step 534 (see FIG. 5C), if there is a closest known anomaly pattern, the monitoring server can proceed to step 536. If there is no closest known anomaly pattern, the monitoring server can proceed to step 538. If the monitoring server uses a distance metric threshold to evaluate the similarity or closeness between metric anomaly patterns, the monitoring server may not identify any closest know anomaly pattern. This may indicate that the metric anomaly pattern is unknown to the monitoring server, and represents a novel or unknown anomaly.

At step 536, the monitoring server can identify a control instruction corresponding to the closest known anomaly pattern. As described above with reference to FIG. 3, the metric anomaly database may store metric anomaly patterns in association with control instructions. These control instructions may be transmitted to the monitored computer, and executed by the monitored computer in order to correct any underlying issue causing the anomalous metrics. The monitoring server may identify the control instructions by querying the metric anomaly database with a tag or identifier corresponding to the closest known anomaly pattern, and retrieve any related database entries, including the control instructions.

At step 538, the monitoring server can issue an alert, indicating the anomaly pattern has no known fix. The alert may be a message, transmitted to a security or operations team or a support mailbox associated with the security or operations team. The alert may be based off the metric anomaly score, the second metric anomaly score or the metric thresholds. The alert may indicate how or why the alert was trigger, e.g., which metric or set of metrics triggered the alert, whether the metrics were outside their corresponding metric thresholds, whether the metric anomaly score or second anomaly score exceeded a metric anomaly score threshold, etc. The alert may additionally be issued using a visualization, e.g., by generating a visual indicator (such as a red exclamation point) on a visualization.

At step 540, the monitoring server can issue an alert, indicating the anomaly pattern has a known fix, further indicating that there is a control instruction stored in the metric anomaly database in association with the identified closest known anomaly pattern. This may indicate to a security or operations team that the underlying issue can be addressed immediately with the known fix, and that no troubleshooting needs to take place. Similar to step 538, the alert may be a message, transmitted to a security or operations team or a support mailbox associated with the security or operations team. The alert may be based on the metric anomaly score, the second metric anomaly score, or the metric thresholds. The alert may indicate how or why the alert was triggered, e.g., which metrics or set of metrics triggered the alert, whether the metrics were outside their corresponding metric thresholds, whether the metric anomaly score or second anomy score exceed a metric anomaly score threshold, etc. The alert may be additionally issued using a visualization, e.g., by generating a visual indicator on the visualization.

At step 542, the monitoring server can store the unknown metric anomaly pattern in the metric anomaly database. If the monitoring server encounters a similar metric anomaly pattern in a future set of metrics received from the monitored computer, the monitored server can identify the metric anomaly pattern. As the monitoring server has successfully issued an alert, the monitoring server can return to step 506 in FIG. 5A and wait to receive a new current set of metrics to analyze.

At step 544, the monitoring server can verify if the auto-fix feature is enabled. The monitoring server may verify if the auto-fix feature is enabled by checking a configuration file to see if an auto-fix flag is enabled. If the auto-fix feature is enabled, the monitoring server can automatically implement the fix by proceeding to step 546, otherwise, having alerting the security or operations team to the anomaly, the monitoring server can proceed to step 506 in FIG. 5A and wait to receive a new current set of metrics from the monitored computer.

At step 546, the monitoring server can transmit the control instruction to the monitored computer. The monitored computer can then execute or otherwise implement the control instruction in order to fix the issue causing the anomalous current metrics and the current metric values. The monitoring server can then proceed to step 506 in FIG. 5A and wait to receive a new current set of metrics and a new set of current metric values from the monitored computer.

FIGS. 8-11 summarize the results of two experiments, conducted as a proof-of-concept for some embodiments. Each experiment was performed using two virtual machines, a client virtual machine (corresponding to the monitored computer) and a server virtual machine (corresponding to the monitoring server). Metrics and metric values corresponding to monitored services operating on the client virtual machine were sent to the server virtual machine. The server virtual machine determined metric thresholds corresponding to those metrics and issued alerts if metric values received from the client virtual machine were outside the metric thresholds. These experiments illustrate the effectiveness of dynamic threshold generation.

In the first experiment, the client virtual machine operated a web browser that was used to browse the Internet. A web browser is a useful testing program because its status and performance (and by extension, metric values corresponding to its status and performance) change greatly when underlying tasks change. For example, CPU usage may be significantly greater when a web browser is used to stream video, compared to more typical web browsing (e.g., loading and viewing web pages with text and pictures, such as news articles). In the second experiment, the client virtual machine operated a custom program designed to randomly cause memory leaks over the course of the experiment.

Each experiment was conducted over a 10 minute time period. Every thirty seconds, a set of metrics and their associated metric values collected by the client virtual machine was sent to the server virtual machine. In the first experiment (corresponding to FIGS. 8 and 9), the set of metrics and their associated metric values comprised only CPU cycles. In the second experiment (corresponding to FIGS. 10 and 11) the set of metrics and their associated metric values comprised only virtual memory allocated (in kilobytes).

In both experiments, thresholds were calculated using the five preceding sets of metrics and their associated metric values, i.e., the five previously collected CPU cycle values and the five previously collected virtual memory allocation values. The server virtual machine would calculate the metric average and metric standard deviation corresponding to these five previously collected metrics. The deviation multiplier was set to one, indicating that received metrics and their associated metric values were normal if they were within one standard deviation of the mean. In both experiments, the metric lower threshold was equal to the difference between the calculated metric average and metric standard deviation, and the metric upper threshold was equal to the sum of the calculated metric average and metric standard deviation. In both experiments, if metrics and their associated metric values received from the client virtual machine were outside the calculated thresholds, the server virtual machine would issue an alert.

Figure 8:
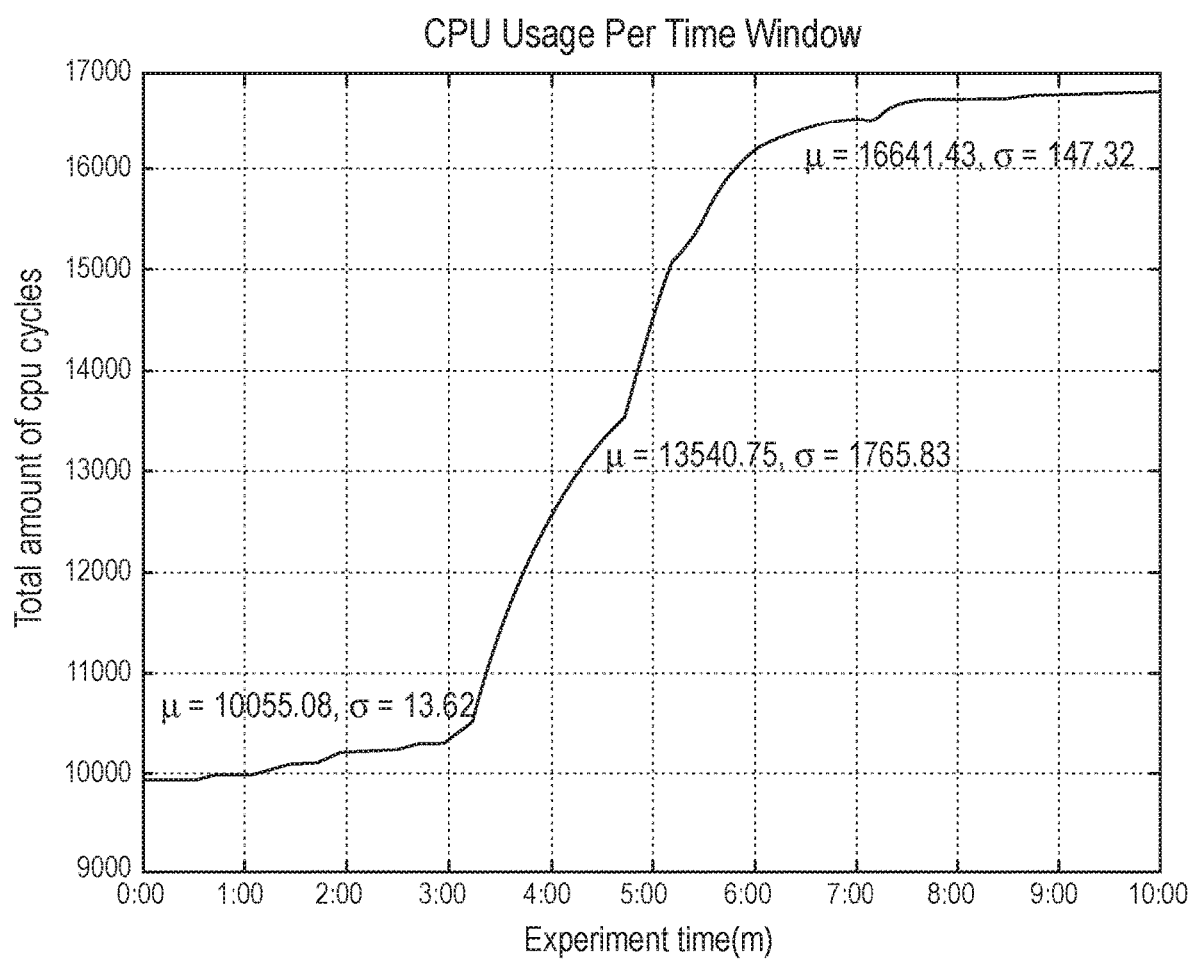
FIG. 8 shows a graph of CPU usage versus time for a proof-of-concept CPU usage experiment.

In the first experiment, the web browser was idled for the first three minutes of the ten minute experiment, for the next three minutes (i.e., minute three to minute six) the web browser was used to stream video and for the final four minutes, the web browser was set to idle again. FIG. 8 shows a graph of cumulative CPU cycles used by the web browser over the ten minute experiment. As expected, the change in cumulative CPU cycles is smaller in the two idle periods than in the video streaming period, indicating by the gradual slopes between zero and three minutes and between six and ten minutes, and the steep slope between three and six minutes. FIG. 8 also shows the metric average and metric standard deviation corresponding to the first idle period, the video streaming period, and the second idle period.

During the experiment, alerts began triggering from approximately minute three to minute five. During this period, the metrics and their associated metric values used to determine the metric thresholds were primarily collected during the idle period. As such, the increased CPU cycles during video streaming were much greater than the calculated upper threshold, causing the server virtual machine to issue alerts. However, after minute five, the metrics and their associated metric values used to determine the metric thresholds primarily corresponded to the video streaming period. As such, the thresholds adjusted upward, and CPU cycle values received from the client virtual machine were no longer outside of the metric thresholds, causing the alerts to stop.

When the web browser was set to idle again at minute six, alerts began triggering from about minute six to minute nine. During this period, the metric values used to determine the metric thresholds were primarily collected during the video streaming period. As such, the CPU cycles during browser idling were significantly lower than the metric lower threshold, and an alert was trigger. By minute nine however, the metrics and their associated metric values used to determine the metric thresholds were primarily from the second idle period. As such, the thresholds adjusted downward and the CPU cycle values received from the client virtual machine were no longer outside of the metric thresholds, causing the alerts to stop.

Figure 9:
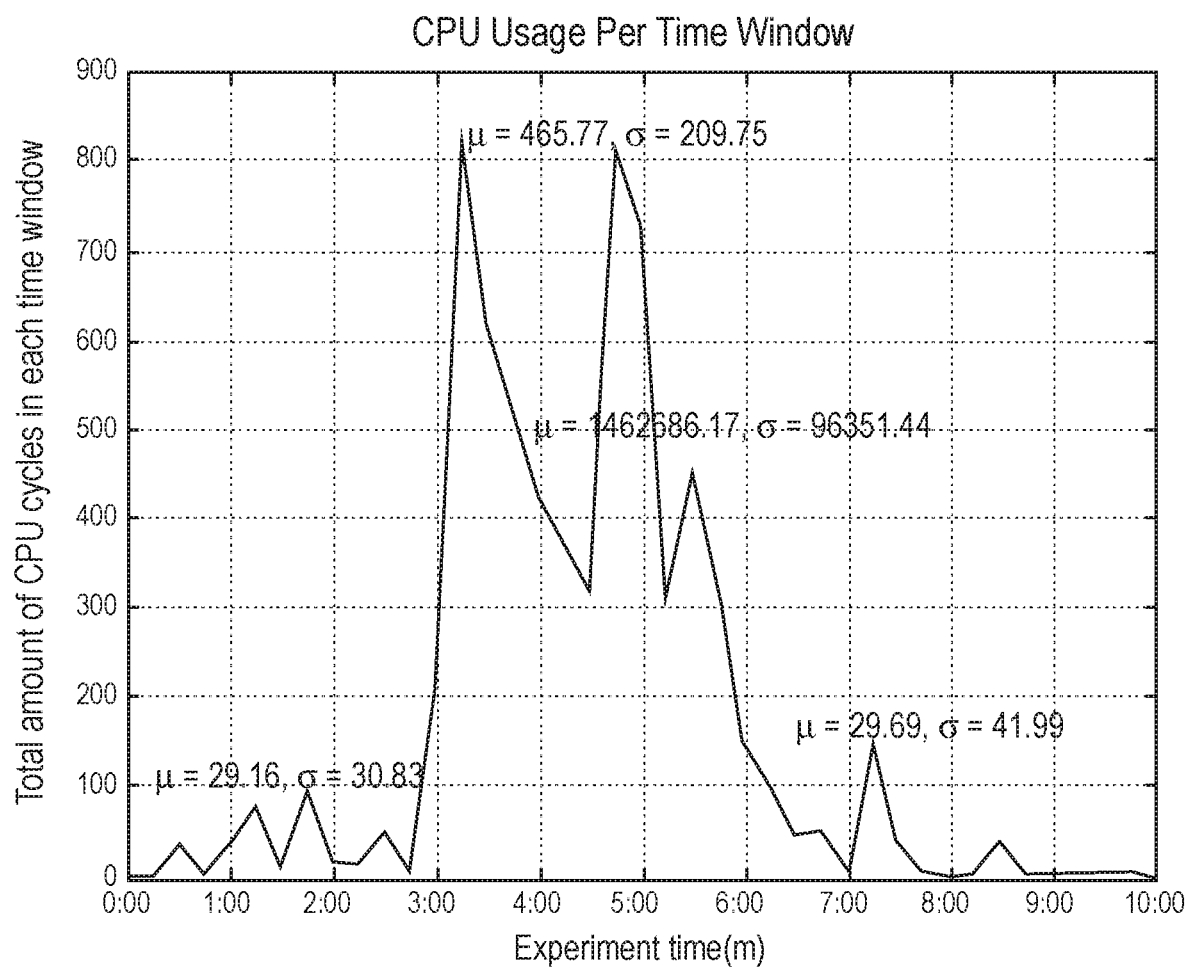
FIG. 9 shows a graph of CPU usage per time window versus time for the proof-of-concept CPU usage experiment.

FIG. 9 shows a non-cumulative graph of CPU usage during each collection window. As expected, CPU usage is relatively low during the first idle period and second idle period, and increases dramatically during the streaming period.

The experiment illustrates an advantage of self-adjusting metric thresholds. Rather than alerting continuously over the video streaming period, the server virtual machine was able to adjust its thresholds to account for the "new normal" video streaming behavior. In a conventional system with static thresholds, the server virtual machine would have continually sent alerts over the entirety of the video streaming period. This could present a serious hassle to security or operations teams, who could be effectively spammed by their own alerting system. By dynamically adjusting thresholds, the server virtual machine avoided sending alerts during a one minute period, substantially reducing the number of alerts that a hypothetical security or operations team would receive, relative to a conventional system.

In the second experiment, the client virtual machine executed a memory leakage program that was designed to slowly use up the memory space. The rate of memory leakage was intentionally designed to be gradual, in order to test the capabilities of the server virtual machine to detect gradual changes in service metrics. In the experiment, the rate of memory leakage was logarithmic, however in a real-world application, the rate of memory leakage is expected to be at least linear. As a linear rate of change is typically more rapid than a logarithmic rate, detection of anomalies in the experimental case indicates a high probability of anomaly detection in the practical, linear rate.

Figure 10:
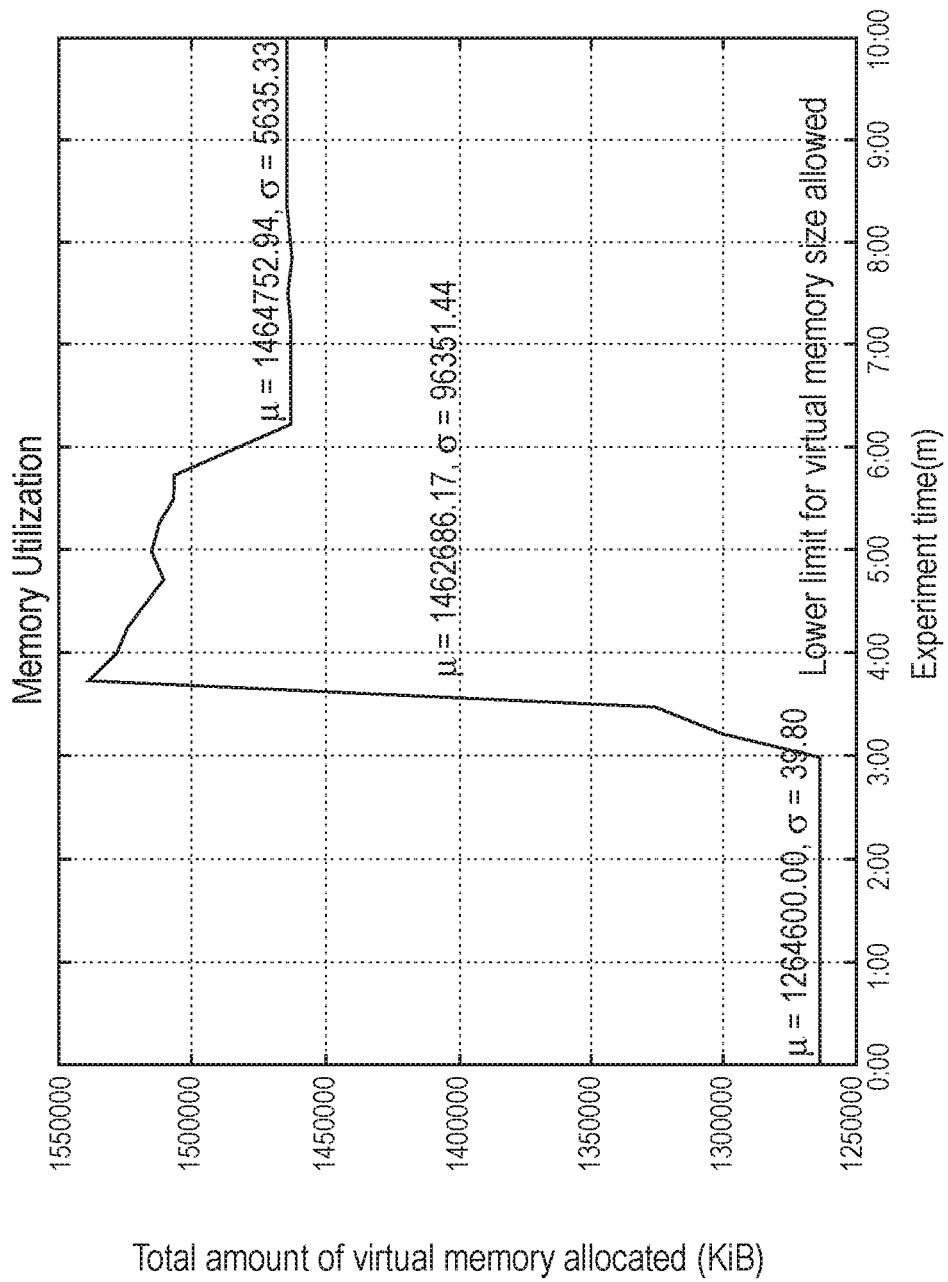
FIG. 10 shows a graph of memory utilization versus time for a proof-of-concept memory leakage experiment.

FIG. 10 shows a graph of the total amount of virtual memory allocated to the memory leakage program over a 10 minute period. Notably the virtual memory allocation was approximately static at approximately 1264600 KB (approximately 1.26 GB) for the first three minutes, increase to approximately 1,500,000 KB (approximately 1.5 GB), before falling to approximately 1,464,753 KB (approximately 1.46 GB) for the final four minutes. Notably, although there appears to be a steep increase in memory utilization, the actual change in memory usage between minute zero and minute ten was approximately 200,000 KB (approximately 0.2 GB), approximately 16% of the starting virtual memory allocation, indicating a gradual change in virtual memory allocation over the ten minute period. This is expected given then logarithmic design of the memory leakage program.

Figure 11:
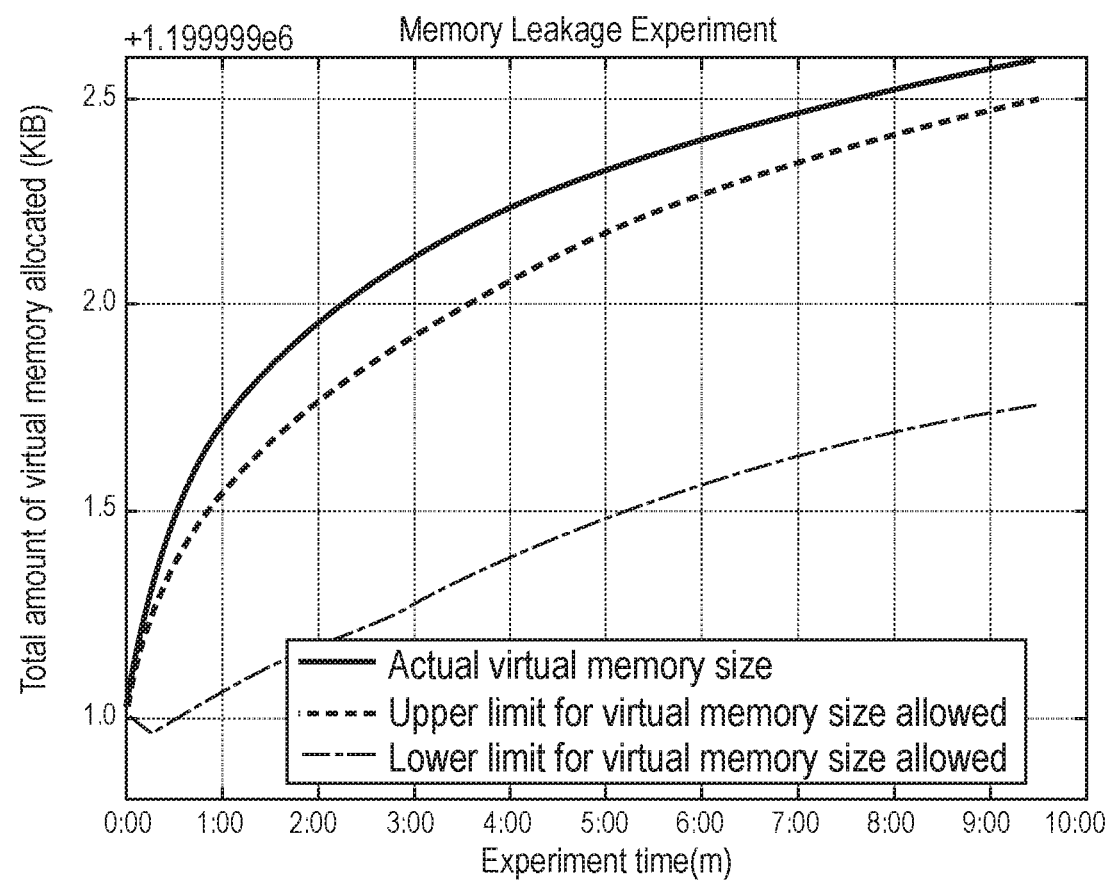
FIG. 11 shows a graph of virtual memory allocation versus time for the proof-of-concept memory leakage experiment.

FIG. 11 shows a graph of the cumulative virtual memory allocated over the entire second experiment, along with the metric upper and lower thresholds as a function of time. Notably, the logarithmic characteristic of the memory leakage program can be seen in the curves for the cumulative virtual memory allocation and metric upper and lower thresholds. The curve with greatest value is the actual virtual memory size. The curve with second greatest value is the metric upper threshold for virtual memory size, and the curve with the lowest values is the metric lower threshold for virtual memory size.

As can be seen in FIG. 11, the actual virtual memory size was always greater than both the metric upper and lower threshold for the ten minute experiment. As such, the server virtual machine detected the anomalous memory leakage caused by the memory leakage program, even with the memory leakage occurring at a gradual rate. This illustrates another advantage of using dynamic thresholds, as they can successfully detect anomalies and issue alerts even in the case of gradual or slow changes in metrics.

Any of the computer systems mentioned herein may utilize any suitable number of subsystems. In some embodiments, a computer system includes a single computer apparatus, where the subsystems can be components of the computer apparatus. In other embodiments, a computer system can include multiple computer apparatuses, each being a subsystem, with internal components.

A computer system can include a plurality of the components or subsystems, e.g., connected together by external interface or by an internal interface. In some embodiments, computer systems, subsystems, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g., an application specific integrated circuit or field programmable gate array) and/or using computer software with a generally programmable processor in a modular or integrated manner. As used herein a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer or other suitable display for providing any of the results mentioned herein to a user.

Any of the methods described herein may be totally or partially performed with a computer system including one or more processors, which can be configured to perform the steps. Thus, embodiments can be involve computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, and of the steps of any of the methods can be performed with modules, circuits, or other means for performing these steps.

The specific details of particular embodiments may be combined in any suitable manner without departing from the spirit and scope of embodiments of the invention. However, other embodiments of the invention may be involve specific embodiments relating to each individual aspect, or specific combinations of these individual aspects. The above description of exemplary embodiments of the invention has been presented for the purpose of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications and description mentioned herein are incorporated by reference in their entirety for all purposes. None is admitted to be prior art.

What is claimed is:

1. A method comprising:
receiving, by a monitoring server, from a monitored computer, a set of current metrics and a set of current metric values associated with the set of current metrics;
determining, by the monitoring server, a current time interval associated with the set of current metrics and the set of current metric values;
storing, by the monitoring server, the set of current metrics and the set of current metric values in a metrics database in association with the current time interval;
retrieving, by the monitoring server, a predetermined number of sets of metrics and their associated metric values from the metrics database, wherein the predetermined number of sets of metrics and their associated metric values correspond to a predetermined number of time intervals;
determining, by the monitoring server, a set of metric thresholds corresponding to the set of current metrics, wherein the set of metric thresholds are determined based on the predetermined number of sets of metrics and their associated metric values;
determining, by the monitoring server, whether each current metric value of the set of current metric values corresponding to the set of current metrics is within corresponding metric thresholds of the set of metric thresholds;
determining, by the monitoring server, a first metric anomaly score by applying the set of current metric values corresponding to the set of current metrics as inputs to a machine learning model;
determining, by the monitoring server, a second metric anomaly score based on the first metric anomaly score and a set of metric deviation values derived from the set of current metric values and the set of metric thresholds; and
issuing, by the monitoring server, an alert based on the second metric anomaly score.

2. The method of claim 1, wherein the step of determining the set of metric thresholds comprises:
determining, by the monitoring server, a set of metric averages and a set of metric standard deviations based on the predetermined number of sets of metrics and their associated metric values;
determining, by the monitoring server, a set of metric standard deviation products by multiplying each metric standard deviation of the set of metric standard deviations by a corresponding deviation multiplier of a set of deviation multipliers;

determining, by the monitoring server, a set of metric upper thresholds by respectively summing the set of metric averages and the set of metric standard deviation products; and determining, by the monitoring server, a set of metric lower thresholds by respectively determining a difference between the set of metric averages and the set of metric standard deviation products, wherein the set of metric thresholds comprises the set of metric upper thresholds and the set of metric lower thresholds.

3. The method of claim 2, wherein determining, by the monitoring server, whether each current metric value of the set of current metric values is within corresponding metric thresholds of the set of metric thresholds comprises:

determining, by the monitoring server, whether each current metric value of the set of current metric values is less than or equal to each metric upper threshold of the set of metric upper thresholds; and determining, by the monitoring server, whether each current metric value of the set of current metric values is greater than or equal to each metric lower threshold of the set of metric lower thresholds.

4. The method of claim 1, wherein the set of current metrics and the predetermined number of set of metrics comprise one or more metrics from a list of: number of minor faults, number of major faults, number of system calls, uptime, number of heartbeats, number of CPU cycles, a change in the number of minor faults, a change in the number of major faults, a change in the number of system calls, a change in the uptime, a change in the number of heartbeats, or a change in the number of CPU cycles.

5. The method of claim 1, further comprising:

determining, by the monitoring server, a metric anomaly pattern corresponding to the set of current metrics, the set of current metric values, and the predetermined number of sets of metrics and their associated metric values; and storing, by the monitoring server, the metric anomaly pattern in a metric anomaly database.

6. The method of claim 1, further comprising:

determining, by the monitoring server, a metric anomaly pattern corresponding to the set of current metrics, the set of current metric values, and the predetermined number of sets of metrics and their associated metric values;

identifying, by the monitoring server, a closest known anomaly pattern in a metric anomaly database;

identifying, by the monitoring server, a control instruction corresponding to the closest known anomaly pattern; and transmitting, by the monitoring server, the control instruction to the monitored computer.

7. The method of claim 6, wherein the set of current metrics and the set of current metric values include system activity data, and wherein the control instruction includes a change to a security policy associated with a monitored service performed by the monitored computer, wherein the security policy indicates a plurality of allowed system activities and a plurality of disallowed system activities.

8. The method of claim 1, further comprising:

retrieving, by the monitoring server, a plurality of sets of metrics and their associated metric values from the metrics database; and training, by the monitoring server, the machine learning model using the plurality of sets of metrics and their associated metric values as training data.

9. The method of claim 1, wherein the set of metric thresholds are additionally based on a prior set of metric thresholds.

10. The method of claim 1, wherein the set of current metrics and the set of current metric values correspond to one or more monitored services executed by the monitored computer.

11. A monitoring server comprising:

a processor; and a non-transitory computer readable medium coupled to the processor, the non-transitory computer readable medium comprising code, executable by the processor for implementing a method comprising:

receiving, from a monitored computer, a set of current metrics and a set of current metric values associated with the set of current metrics;

determining a current time interval associated with the set of current metrics and the set of current metric values;

storing the set of current metrics and the set of current metric values in a metrics database in association with the current time interval;

retrieving a predetermined number of sets of metrics and their associated metric values from the metrics database, wherein the predetermined number of sets of metrics and their associated metric values correspond to a predetermined number of time intervals;

determining a set of metric thresholds corresponding to the set of current metrics, wherein the set of metric thresholds are determined based on the predetermined number of sets of metrics and their associated metric values;

determining whether each current metric value of the set of current metric values corresponding to the set of current metrics is within corresponding metric thresholds of the set of metric thresholds;

determining a first metric anomaly score by applying the set of current metric values corresponding to the set of current metrics as inputs to a machine learning model;

determining a second metric anomaly score based on the first metric anomaly score and a set of metric deviation values derived from the set of current metric values and the set of metric thresholds; and issuing an alert based on the second metric anomaly score.

12. The monitoring server of claim 11, wherein the step of determining the set of metric thresholds comprises:

determining a set of metric averages and a set of metric standard deviations based on the predetermined number of sets of metrics and their associated metric values;

determining a set of metric standard deviation products by multiplying each metric standard deviation of the set of metric standard deviations by a corresponding deviation multiplier of a set of deviation multipliers;

determining a set of metric upper thresholds by respectively summing the set of metric averages and the set of metric standard deviation products; and determining a set of metric lower thresholds by respectively determining a difference between the set of metric averages and the set of metric standard deviation products, wherein the set of metric thresholds comprises the set of metric upper thresholds and the set of metric lower thresholds.

13. The monitoring server of claim 12, wherein determining whether each current metric value of the set of current metric values is within corresponding metric thresholds of the set of metric thresholds comprises:
- determining whether each current metric value of the set of current metric values is less than or equal to each metric upper threshold of the set of metric upper thresholds; and
- determining whether each current metric value of the set of current metric values is greater than or equal to each metric lower threshold of the set of metric lower thresholds.

14. The monitoring server of claim 11, wherein the set of current metrics and the predetermined number of sets of metrics comprise one or more metrics from a list of: number of minor faults, number of major faults, number of system calls, uptime, number of heartbeats, number of CPU cycles, a change in the number of minor faults, a change in the number of major faults, a change in the number of system calls, a change in the uptime, a change in the number of heartbeats, or change in the number of CPU cycles.

15. The monitoring server of claim 11, wherein the method further comprises:
- determining a metric anomaly pattern corresponding to the set of current metrics, the set of current metric values, and the predetermined number of sets of metrics and their associated metric values; and
- storing the metric anomaly pattern in a metric anomaly database.

16. The monitoring server of claim 11, wherein the method further comprises:
- determining a metric anomaly pattern corresponding to the set of current metrics, the set of current metric values, and the predetermined number of sets of metrics and their associated metric values;
- identifying a closest known anomaly pattern in a metric anomaly database;
- identifying a control instruction corresponding to the closest known anomaly pattern; and
- transmitting the control instruction to the monitored computer.

17. The monitoring server of claim 16, wherein the set of current metrics and the set of current metric values include system activity data, and wherein the control instruction includes a change to a security policy associated with a monitored service performed by the monitored computer, wherein the security policy indicates a plurality of allowed system activities and a plurality of disallowed system activities.

18. The monitoring server of claim 11, wherein the method further comprises:
- retrieving a plurality of sets of metrics and their associated metric values from the metrics database; and
- training the machine learning model using the plurality of sets of metrics as training data.

19. The monitoring server of claim 11, wherein the set of metric thresholds are additionally based on a prior set of metric thresholds.

20. The monitoring server of claim 11, wherein the set of current metrics correspond to one or more monitored services executed by the monitored computer.

* * * * *